(12) United States Patent
Abdul Jabbar et al.

(10) Patent No.: US 11,228,039 B2
(45) Date of Patent: Jan. 18, 2022

(54) CHROMATE BASED CERAMIC ANODE MATERIALS FOR SOLID OXIDE FUEL CELLS

(71) Applicant: University of Maryland, College Park, College Park, MD (US)

(72) Inventors: Mohammed Hussain Abdul Jabbar, College Park, MD (US); Eric D. Wachsman, Fulton, MD (US); Ke-Ji Pan, North Bethesda, MD (US)

(73) Assignee: University of Maryland, College Park, College Park, MD (US)

( * ) Notice: Subject to any disclaimer, the term of this patent is extended or adjusted under 35 U.S.C. 154(b) by 188 days.

(21) Appl. No.: 16/141,051

(22) Filed: Sep. 25, 2018

(65) Prior Publication Data

US 2019/0097243 A1 Mar. 28, 2019

Related U.S. Application Data

(60) Provisional application No. 62/562,742, filed on Sep. 25, 2017.

(51) Int. Cl.
*H01M 4/90* (2006.01)
*C01G 37/14* (2006.01)
(Continued)

(52) U.S. Cl.
CPC .......... *H01M 4/9033* (2013.01); *C01G 37/14* (2013.01); *C01G 39/006* (2013.01); *C04B 35/12* (2013.01); *C04B 35/62675* (2013.01); *C04B 35/62695* (2013.01); *C01P 2002/34* (2013.01); *C01P 2002/52* (2013.01); *C01P 2002/54* (2013.01); *C01P 2002/60* (2013.01); *C01P 2002/72* (2013.01); *C01P 2002/77* (2013.01); *C01P 2004/03* (2013.01); *C01P 2006/32* (2013.01);
(Continued)

(58) Field of Classification Search
CPC ... H01M 4/9033; C01G 37/14; C01G 39/006; C01G 35/12; C01P 2002/34
See application file for complete search history.

(56) References Cited

U.S. PATENT DOCUMENTS

| 8,354,011 | B2 * | 1/2013 | Elangovan | H01M 8/20 204/266 |
|---|---|---|---|---|
| 2013/0248360 | A1 * | 9/2013 | Osada | H01M 8/1246 204/242 |
| 2014/0302420 | A1 * | 10/2014 | Wachsman | H01M 4/9033 429/489 |

FOREIGN PATENT DOCUMENTS

| CN | 103545537 A | * | 1/2014 | |
|---|---|---|---|---|
| JP | H0812421 B2 | * | 2/1996 | ........... G03F 7/0226 |

OTHER PUBLICATIONS

Machine Translation of JP 0812421 A1 (Sep. 18, 2020) (Year: 2020).*

(Continued)

*Primary Examiner* — Matthew J Merkling
(74) *Attorney, Agent, or Firm* — Sterne, Kessler, Goldstein & Fox P.L.L.C.

(57) ABSTRACT

The disclosure relates to solid oxide fuel cell (SOFC) anode materials that comprise various compositions of chromate based oxide materials. These materials offer high conductivity achievable at intermediate and low temperatures and can be used to prepare the anode layer of a SOFC. A method of making a low- or intermediate-temperature SOFC having an anode layer comprising a chromate based oxide material is also provided.

14 Claims, 9 Drawing Sheets

(51) Int. Cl.
   C01G 39/00 (2006.01)
   C04B 35/12 (2006.01)
   C04B 35/626 (2006.01)
   H01M 8/124 (2016.01)
   H01M 4/86 (2006.01)

(52) U.S. Cl.
   CPC .. C01P 2006/40 (2013.01); C04B 2235/3208 (2013.01); C04B 2235/3213 (2013.01); C04B 2235/3224 (2013.01); C04B 2235/3225 (2013.01); C04B 2235/3227 (2013.01); C04B 2235/3251 (2013.01); C04B 2235/3256 (2013.01); C04B 2235/3281 (2013.01); C04B 2235/442 (2013.01); C04B 2235/768 (2013.01); H01M 2004/8684 (2013.01); H01M 2008/1293 (2013.01)

(56) References Cited

OTHER PUBLICATIONS

Machine Translation of CN103545537A (Sep. 18, 2020) (Year: 2020).*
Properties of mixed oxides based on neodymium chromite in oxidizing and reducing atmospheres. Zemtsov, V. I.; Anikina, E. L.; Antonov, B. D. Inorganic Materials (Translation of Neorganicheskie Materialy) (1999), 35(1), 60-63 (Year: 1999).*
Armstrong, T.R., et al., "The effect of reducing environments on the stability of acceptor substituted yttrium chromite," *Solid State Ionics* 92:213-223, Elsevier Science B.V., Netherlands (1996).
Carini II, G.F., et al., "Defect Structure, Nonstiochiometry, and Phase Stability of Ca-Doped $YCrO_3$," *Journal of Solid State Chemistry* 94:329-336, Academic Press, Inc., United States (1991).
Carini II, G.F., et al., "Electrical conductivity, Seebeck coefficient and defect chemistry of Ca-doped $YCrO_3$," *Solid State Ionics* 49:233-243, Elsevier Science Publishers B.V., Netherlands (1991).
Oikawa, K., et al., "Structural Phase Transition of Orthorhombic $LaCrO_3$ Studied by Neutron Powder Diffraction," *Journal of Solid State Chemistry* 154:524-529, Academic Press, United States (2000).
Qasim, I., et al., "Impact of Cu Doping on the Structure and Electronic Properties of $LaCr_{1-y}Cu_yO_3$," *Inorganic Chemistry* 53:2240-2247, American Chemical Society, United States (2014).
Samson, A., et al., "High Performance Cathodes for Solid Oxide Fuel Cells Prepared by Infiltration of $La_{0.6}Sr_{0.4}CoO_{3-\delta}$ into Gd-Doped Ceria," *Journal of The Electrochemical Society* 158:B650-B659, The Electrochemical Society, United States (2011).
S. Tao and J.T.S. Irvine, "A redox-stable efficient anode for solid-oxide fuel cells," *Nature Materials* 2:320-323, Nature Publishing Group, United Kingdom (2003).
E.D. Wachsman and K.T. Lee, "Lowering the Temperature of Solid Oxide Fuel Cells," *Science* 334:935-939, American Association for the Advancement of Science, United States (2011).
Wang, S., et al., "Stable, easily sintered Ca-Zn-doped $YCrO_3$ as novel interconnect materials for co-fired yttrium-stabilized zirconia-based solid oxide fuel cells," *Journal of Power Sources* 188:483-488, Elsevier B.V., Netherlands (2009).
Yan, K., et al., "Chemical compatibility of doped yttrium chromite and ceria composite materials with YSZ electrolyte," *Solid State Ionics* 288:88-93, Elsevier B.V., Netherlands (2016).
Yoon, K.J., et al., "Improvement of Sintering, Thermal Behavior, and Electrical Properties of Calcium- and Transition Metal-Doped Yttrium Chromite," *Electrochemical and Solid-State Letters* 13:B101-B105, The Electrochemical Society, United States (2010).
Yoon, K.J., et al., "Effect of nickel substitution on defect chemistry, electrical properties, and dimensional stability of calcium-doped yttrium chromite," *Solid State Ionics* 193:60-65, Elsevier B.V., Netherlands (2011).

* cited by examiner

CHROMATE BASED CERAMIC ANODE MATERIALS FOR SOLID OXIDE FUEL CELLS

STATEMENT REGARDING FEDERALLY SPONSORED RESEARCH OR DEVELOPMENT

This invention was made with government support under DEAR0000494 awarded by the Department of Energy (DOE) Advanced Research Projects Agency-Energy (ARPA-E). The government has certain rights to this invention.

BACKGROUND OF THE INVENTION

Field of the Invention

The disclosure relates to solid oxide fuel cell (SOFC) anode materials that comprise various compositions of chromate based oxide materials. These materials offer high conductivity achievable at intermediate and low temperatures and can be used to prepare the anode layer of a SOFC. A method of making a low- or intermediate-temperature SOFC having an anode layer comprising a chromate based oxide material is also provided.

Background

Solid oxide fuel cells (SOFCs) are energy efficient, all-solid-state electrochemical devices that can convert chemical energy stored in fuels such as hydrogen or hydrocarbons into electrical energy, with fuel flexibility a unique feature of SOFC technology. Conventionally, SOFCs operate at high temperatures of ≥800° C. and such high-temperature operation leads to various issues such as electrode densification and interdiffusion of elements. To overcome these problems and to extend the choice of material selection that can be used in SOFCs, tremendous efforts have been made to lower the operating temperature of SOFCs (≤600° C.). Lowering the temperature without compromising SOFC performance is critical to reduce the overall system cost. A low-temperature SOFC (LT-SOFC) was shown to have improved reliability and enormous potential to satisfy the power requirements in stationary and transportation sectors (Wachsman, E. D., et al., *Science* 334:935-939 (2011)).

For SOFCs operating on hydrocarbon fuels the development of an anode becomes critical, because of their higher activation over-potential. Ni-GDC cermets have been considered a state-of-art anode for LT-SOFCs; however, they are susceptible to carbon formation and intolerant to $H_2S$ under certain operating conditions in hydrocarbon fuels. Further, they are reduction-oxidation (redox) unstable because Ni undergoes huge volumetric expansion upon re-oxidation. As such, alternative anode materials are needed to replace the standard nickel-based cermet anodes. The desired characteristics of an alternative SOFC anode are high electronic and oxide ion conductivity, redox stability, an appropriate thermal expansion coefficient, catalytic activity for $H_2$/hydrocarbon oxidation, chemical stability, and sufficient porosity in combination with mechanical strength.

Ceramic oxides are potential alternative anode materials for SOFCs if they are mixed ionic and electronic conductors (MIEC) in reducing gas conditions. The main advantage of MIEC based anodes is the enlargement of the fuel oxidation reaction zones to the entire anode surface by extending the triple phase boundary. An example of a MIEC ceramic oxide is $La_{0.75}Sr_{0.25}Cr_{0.5}Mn_{0.5}O_{3-\delta}$ (Tao, J. T., et al., *Nature Materials* 2:320-323 (2003)). This material was reported to be stable over wide ranges of oxygen partial pressures (0.21 to 10-17 atm) and exhibited p-type conduction mechanism, with a higher conductivity of 38 S/cm in air and a low electronic conductivity of 2.7 S/cm in reducing gas at 900° C. As such, low catalytic activity, low electronic conductivity (at temperatures <900° C.) and poor sintering characteristics limit the applicability of this material as an anode for LT-SOFCs. Catalytic activity for hydrogen oxidation can be improved with the addition of active metals or oxides (Ni and $CeO_2$) on the ceramic oxide surfaces. However, the problems associated with low electronic conductivity and poor sinterability is more difficult to solve. Further, $La_{0.75}Sr_{0.25}Cr_{0.5}Mn_{0.5}O_{3-\delta}$ ceramic oxide undergoes an undesirable orthorhombic to rhombohedral structural phase transition at 260° C. that may lead to failure of the SOFC during heating or cooling cycles (Oikawa, K., et al., *J. Solid State Chemistry* 154:524-529 (2000)).

$Y_{0.8}Ca_{0.2}CrO_{3-\delta}$ is another MIEC perovskite type oxide having properties similar to that of $La_{0.75}Sr_{0.25}Cr_{0.5}Mn_{0.5}O_{3-\delta}$ (Carini, G., et al., *J. Solid State Chemistry* 94:329-336 (1991)). $Y_{0.7}Ca_{0.3}CrO_{3-\delta}$ based materials have been studied as SOFC interconnects and lately identified as a potential anode material for SOFCs (Wang, S., et al., *J. Power Sources* 188:483-488 (2009)). Transition metal substituted $YCrO_{3-\delta}$ based ceramic oxides, such as $Y_{0.7}Ca_{0.3}CrO_{3-\delta}$, are structurally stable and the orthorhombic phase is maintained throughout the temperatures range of 25° C. to 1200° C. In particular, Ni-substituted $Y_{0.7}Ca_{0.3}CrO_{3-\delta}$ showed p-type conductivity throughout all ranges of oxygen partial pressures. Moreover, Ni doping at the Cr-site of $Y_{0.8}Ca_{0.2}CrO_{3-\delta}$ stabilized the defect structure and suppressed the oxygen vacancy formation in reducing conditions (Yoon, K. J., et al., *Solid State Ionics* 193:60-65 (2011)).

Unlike transition metal doped $LaCrO_{3-\delta}$, $YCrO_{3-\delta}$ based ceramic oxides have shown comparatively higher conductivities without forming hydroxides under SOFC operating conditions (Armstrong, T. R., et al., *Solid State Ionics* 92:213-223 (1996)). The electrical conductivity increased from 0.2 to 5.8 S/cm at 900° C. for a 15% Ni-doped sample under reducing gas conditions (Yoon, K. J., et al., *Solid State Ionics* 193:60-653 (2011)). However, such conductivities are only suitable for high temperature operating SOFCs only.

Thus, there is a need for an improved low temperature anode material for use within solid oxide fuel cells. There is a need for new electronically conductive ceramic materials that meet both the conductivity and stability requirements of the anode and are compatible with intermediate- and low-temperature operation.

BRIEF SUMMARY OF THE INVENTION

Some embodiments include a solid oxide fuel cell having a cathode layer; an electrolyte layer; and an anode layer. The anode layer comprises a chromate based oxide material.

In some embodiments, the disclosure provides a solid oxide fuel cell comprising:

a cathode layer; an electrolyte layer; and an anode layer, the anode layer comprising a chromate based oxide material.

In some embodiments, the disclosure provides a solid oxide fuel cell, wherein the anode layer is configured to allow electron percolation through the chromate based oxide material.

The present disclosure provides an oxide composition comprising:

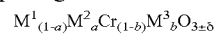

$$M^1_{(1-a)}M^2_aCr_{(1-b)}M^3_bO_{3\pm\delta} \qquad (I)$$

wherein:
M¹ is a metal selected from the group consisting of Y, Nd, Pr, La, and a combination thereof;
M² is a metal selected from the group consisting of Ca and Sr;
M³ is a metal selected from the group consisting of Cu and Mo;
a is about 0.1-0.5;
b is about 0.01-0.2; and
0≤δ≤1.5.

In some embodiments, in formula (I) a is about 0.3-0.4.
In some embodiments, in formula (I) b is about 0.05-0.2.
In some embodiments, in formula (I) M¹ is Y, M² is Ca, and M³ is Cu.
In some embodiments, in formula (I) M¹ is Nd, M² is Ca, and M³ is Cu.
In some embodiments, in formula (I) M¹ is a combination of Y and Nd, M² is Ca, and M³ is Cu.
In some embodiments, in formula (I) M¹ is Pr, M² is Ca, and M³ is Cu.
In some embodiments, in formula (I) n M¹ is La, M² is Sr, and M³ is Mo.
In some embodiments, the oxide composition comprises $Y_{0.7}Ca_{0.3}Cr_{0.8}Cu_{0.2}O_{3-\delta}$, $Nd_{0.7}Ca_{0.3}Cr_{0.8}Cu_{0.2}O_{3-\delta}$, $(Y_{0.5}Nd_{0.5})_{0.7}Ca_{0.3}Cr_{0.8}Cu_{0.2}O_{3-\delta}$, $Pr_{0.7}Ca_{0.3}Cr_{0.8}Cu_{0.2}O_{3-\delta}$, or $La_{0.6}Sr_{0.4}Cr_{0.9}Mo_{0.1}O_{3-\delta}$.

The present disclosure also provides a solid oxide fuel cell comprising:
(a) a cathode layer;
(b) an electrolyte layer; and
(c) an anode layer, wherein the anode layer comprises an oxide composition of formula (I):

$$M^1_{(1-a)}M^2_a Cr_{(1-b)}M^3_b O_{3\pm\delta} \qquad (I)$$

wherein:
M¹ is a metal selected from the group consisting of Y, Nd, Pr, La, and a combination thereof;
M² is a metal selected from the group consisting of Ca and Sr;
M³ is a metal selected from the group consisting of Cu and Mo;
a is about 0.1-0.5;
b is about 0.01-0.2; and
0≤δ≤1.5.

In some embodiments, in formula (I) a is about 0.3-0.4.
In some embodiments, in formula (I) b is about 0.05-0.2.
In some embodiments, the anode layer comprises $Y_{0.7}Ca_{0.3}Cr_{0.8}Cu_{0.2}O_{3-\delta}$, $Nd_{0.7}Ca_{0.3}Cr_{0.8}Cu_{0.2}O_{3-\delta}$, $(Y_{0.5}Nd_{0.5})_{0.7}Ca_{0.3}Cr_{0.8}Cu_{0.2}O_{3-\delta}$, $Pr_{0.7}Ca_{0.3}Cr_{0.8}Cu_{0.2}O_{3-\delta}$, or $La_{0.6}Sr_{0.4}Cr_{0.9}Mo_{0.1}O_{3-\delta}$.

In some embodiments, the cathode layer comprises a material selected from the group consisting of lanthanum strontium cobalt oxide (LSC), yttria stabilized zirconia (YSZ), scandia stabilized zirconia (SSZ), gadolinia doped ceria (GDC), samaria doped ceria (SDC), samaria-neodymium doped ceria (SNDC), erbia stabilized bismuth oxide (ESB), dysprosium tungsten stabilized bismuth oxide (DWSB), yttria stabilized bismuth oxide (YSB), and strontium and magnesium doped lanthanum gallate (LSGM).

In some embodiments, the electrolyte layer comprises a material selected from the group consisting of YSZ, SSZ, GDC, SDC, SNDC, ESB, DWSB, YSB, and LSGM.

In some embodiments, the anode layer is infiltrated with Ni-GDC, $La_{0.4}Sr_{0.6}CoO_{3-\delta}$, or a combination thereof.

In some embodiments, wherein in formula (I) M¹ is Y, M² is Ca, and M³ is Cu; the anode layer has a conductivity of between 1 S/cm and 10 S/cm when measured at a temperature between 450° C. and 650° C.

In some embodiments, wherein in formula (I) M¹ is Nd, a combination of Y and Nd, or Pr, M² is Ca, and M³ is Cu; the anode layer has a conductivity of between 7 S/cm and 50 S/cm when measured at a temperature between 350° C. and 650° C.

In some embodiments, wherein in formula (I) M¹ is La, M² is Sr, and M³ is Mo; the anode layer has a conductivity of between 30 S/cm and 40 S/cm when measured at a temperature between 350° C. and 650° C.

In some embodiments, the power density of the solid oxide fuel cell is between about 300 mW/cm² and about 1500 mW/cm² when measured at a temperature between about 500° C. and about 600° C.

DETAILED DESCRIPTION OF THE INVENTION

Figure 1:
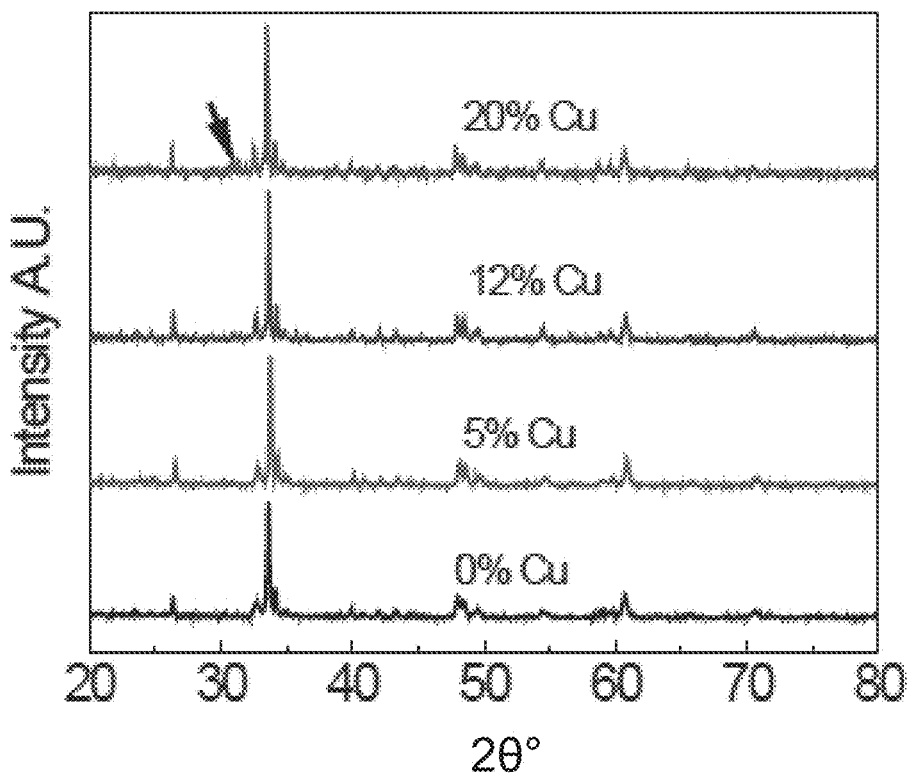
FIG. 1 is an X-ray diffraction (XRD) pattern of $Y_{0.7}Ca_{0.3}Cr_{1-x}Cu_xO_{3-\delta}$, (x=0 (0% Cu), 0.05 (5% Cu), 0.12 (12% Cu), and 0.20 (20% Cu)) and indicates a perovskite oxide phase with orthorhombic symmetry. The arrow indicates phase segregation from excess Cu-oxides (x=0.20).

This specification discloses one or more embodiments that incorporate the features of this invention. The disclosed embodiment(s) merely exemplify the invention. The scope of the invention is not limited to the disclosed embodiment(s). Multiple inventions may be described. The invention is defined by the claims appended hereto.

The term "about" as used herein includes the recited number±10%. Thus, "about ten" means 9 to 11.

As used herein, "at %" means atomic percentage which is calculated based on the number of atoms using the following formula:

Atomic % (at %)=100*((number of atoms of 1 component)/(number of atoms of all components).

Atomic percentage can also be calculated based on the number of moles using the formula:

Atomic % (at %)=100*((number of moles of 1 component)/(number of moles of all components)).

As used herein, "electron percolation" means the transport of an electron through a material. In cases wherein an electron percolates through a single material, such as yttrium calcium chromate copper oxide, electron percolation means that there is a path for the electron through a layer using that material only. For example, if a composite material has a first material and a second material and electrons percolate through the first material, this means that electrons do not have to pass through the second material when moving through the composite.

As used herein, "operating temperature" means the operating temperature of the fuel cell during steady state operation. Preferably, the operating temperature of a fuel cell is the optimal operating temperature that results in the most efficient fuel cell operation based on the fuel cell's structure and materials used to form the fuel cell, i.e. the materials of the anode layer, electrolyte layer(s), cathode layer, etc.

As used herein, "reduction" or "reducing" means the process of removing oxygen from a material, such as an anode layer, at a reduction temperature and in the presence of a reducing atmosphere having a low oxygen partial pressure, such as an $H_2$ atmosphere, $H_2$ and nitrogen atmosphere, or another inter gas atmosphere.

The basic operation of a solid oxide fuel cell is described in U.S. Pat. No. 9,525,179. Air flows into the system through an air inlet. As the air flows past the cathode layer, oxygen atoms are reduced within the cathode layer to create oxygen ions ($O^2$) which flow towards the electrolyte layer. The oxygen ions travel through the electrolyte layer and into the anode layer, and then react with hydrogen gas at the anode layer. The reaction between the oxygen ions and the hydrogen gas at the anode layer creates $H_2O$ and electrons (e). These electrons flow from the anode layer into the electronic circuit and back into the cathode layer. The electronic circuit uses the flow of electrons to power a device and the cathode layer uses the electrons to reduce oxygen atoms and start the process all over again. The chemical reactions for the fuel cell system can be expressed as follows:

$2H_2 + 2O^2 \rightarrow 2H_2O + 4e$      Anode Reaction:

$O_2 + 4e \rightarrow 2O^2$      Cathode Reaction:

$2H_2 + O_2 \rightarrow 2H_2O$.      Overall Cell Reaction:

In some embodiments, the present disclosure provides an oxide composition of formula (I):

$$M^1_{(1-a)}M^2_a Cr_{(1-b)} M^3_b O_{3\pm\delta} \qquad (I)$$

wherein:
M$^1$ is a metal selected from the group consisting of Y, Nd, Pr, La, and a combination thereof
M$^2$ is a metal selected from the group consisting of Ca and Sr;
M$^3$ is a metal selected from the group consisting of Cu and Mo;
a is about 0.1-0.5;
b is about 0.01-0.2; and
0≤δ≤1.5.

In some embodiments, M$^1$ is a metal selected from the group consisting of yttrium (Y), neodymium (Nd), praseodymium (Pr), lanthanum (La), and a combination thereof. In some embodiments, M$^1$ is Y. In some embodiments, M$^1$ is Nd. In some embodiments, M$^1$ is Pr. In some embodiments, M$^1$ is La. In some embodiments, M$^1$ is a combination of Y and Nd.

In some embodiments, M$^2$ is calcium (Ca) or strontium (Sr). In some embodiments, M$^2$ is Ca. In some embodiments, M$^2$ is Sr.

In some embodiments, M$^3$ is copper (Cu) or molybdenum (Mo). In some embodiments, M$^3$ is Cu. In some embodiments, M$^3$ is Mo.

The ratios between the metals are measured as atomic percentage (at %).

In some embodiments, a is about 0.1-0.5, about 0.1-0.4, about 0.1-0.3, about 0.1-0.2, about 0.2-0.5, about 0.2-0.4, about 0.2-0.3, about 0.3-0.5, about 0.3-0.4, or about 0.4-0.5. In some embodiments, a is about 0.3. In some embodiments, a is about 0.4.

In some embodiments, b is about 0.01-0.5, about 0.01-0.2, about 0.05-0.5, about 0.05-0.4, about 0.05-0.3, about 0.05-0.2, about 0.1-0.5, about 0.1-0.4, about 0.1-0.3, about 0.2-

0.5, about 0.2-0.4, or about 0.2-0.5. In some embodiments, b is about 0.2. In some embodiments, b is about 0.1.

The variable in the above compositions represents an oxygen deficiency and/or surplus in the composition. The value of is dependent on temperature and the oxidation state of calcium, chromium, copper, strontium, and molybdenum in the composition. Additionally, the value of may vary depending on the partial pressure of oxygen in the atmosphere and within the anode itself. In some embodiments, is about 0-1.5, about 0-1, about 0-0.5, about 0.5-1.5, or about 1.0-1.5. In some embodiments, δ is about 0.

The measured atomic ratios for Y, Nd, Pr, La, Ca, Sr, Cr, Cu, and O may differ from the theoretical ratios.

In some embodiments, where $M^1$ in formula I is Y, $M^2$ in formula I is Ca, and $M^3$ in formula I is Cu, the oxide composition is of formula (II):

$$Y_{(1-a)}Ca_aCr_{(1-b)}Cu_bO_{3\pm\delta} \qquad (II)$$

wherein:
 a is about 0.1-0.5;
 b is about 0.01-0.2; and
 0≤δ≤1.5.

In some embodiments, a is about 0.1-0.5, about 0.1-0.4, about 0.1-0.3, about 0.1-0.2, about 0.2-0.5, about 0.2-0.4, about 0.2-0.3, about 0.3-0.5, about 0.3-0.4, or about 0.4-0.5. In some embodiments, a is about 0.3.

In some embodiments, b is about 0.01-0.5, about 0.01-0.2, about 0.05-0.5, about 0.05-0.4, about 0.05-0.3, about 0.05-0.2, about 0.1-0.5, about 0.1-0.4, about 0.1-0.3, about 0.2-0.5, about 0.2-0.4, or about 0.2-0.5. In some embodiments, b is about 0.2. In some embodiments, b is about 0.1.

The variable δ in the above compositions represents an oxygen deficiency and/or surplus in the composition. The value of δ is dependent on temperature and the oxidation state of calcium, chromium, copper, strontium, and molybdenum in the composition. Additionally, the value of δ may vary depending on the partial pressure of oxygen in the atmosphere and within the anode itself. In some embodiments, δ is about 0-1.5, about 0-1, about 0-0.5, about 0.5-1.5, or about 1.0-1.5. In some embodiments, δ is about 0.

In some embodiments, the oxide composition of formula (II) is $$Y_{0.7}Ca_{0.3}Cr_{0.8}Cu_{0.2}O_{3\pm\delta}.$$

In some embodiments, where $M^1$ in formula I is Nd, $M^2$ in formula I is Ca, and $M^3$ in formula I is Cu, the oxide composition is of formula (III):

$$Nd_{(1-a)}Ca_aCr_{(1-b)}Cu_bO_{3\pm\delta} \qquad (III)$$

wherein:
 a is about 0.1-0.5;
 b is about 0.01-0.2; and
 0≤δ≤1.5.

In some embodiments, a is about 0.1-0.5, about 0.1-0.4, about 0.1-0.3, about 0.1-0.2, about 0.2-0.5, about 0.2-0.4, about 0.2-0.3, about 0.3-0.5, about 0.3-0.4, or about 0.4-0.5. In some embodiments, a is about 0.3.

In some embodiments, b is about 0.01-0.5, about 0.01-0.2, about 0.05-0.5, about 0.05-0.4, about 0.05-0.3, about 0.05-0.2, about 0.1-0.5, about 0.1-0.4, about 0.1-0.3, about 0.2-0.5, about 0.2-0.4, or about 0.2-0.5. In some embodiments, b is about 0.2. In some embodiments, b is about 0.1.

The variable δ in the above compositions represents an oxygen deficiency and/or surplus in the composition. The value of δ is dependent on temperature and the oxidation state of calcium, chromium, copper, strontium, and molybdenum in the composition. Additionally, the value of δ may vary depending on the partial pressure of oxygen in the atmosphere and within the anode itself. In some embodiments, δ is about 0-1.5, about 0-1, about 0-0.5, about 0.5-1.5, or about 1.0-1.5. In some embodiments, δ is about 0.

In some embodiments, the oxide composition of formula (III) is $$Nd_{0.7}Ca_{0.3}Cr_{0.8}Cu_{0.2}O_{3\pm\delta}.$$

In some embodiments, where $M^1$ in formula I is a combination of Y and Nd, $M^2$ in formula I is Ca, and $M^3$ in formula I is Cu, the oxide composition is of formula (IV):

$$(Y_xNd_y)_{(1-a)}Ca_aCr_{(1-b)}Cu_bO_{3\pm\delta} \qquad (IV)$$

wherein:
 x is about 0.1-0.5;
 y is about 0.1-0.5;
 a is about 0.1-0.5;
 b is about 0.01-0.2; and
 0≤δ≤1.5.

In some embodiments, y is about 0.1-0.5, about 0.1-0.4, about 0.1-0.3, about 0.1-0.2, about 0.2-0.5, about 0.2-0.4, about 0.2-0.3, about 0.3-0.5, about 0.3-0.4, or about 0.4-0.5. In some embodiments, y is about 0.5.

In some embodiments, x is about 0.1-0.5, about 0.1-0.4, about 0.1-0.3, about 0.1-0.2, about 0.2-0.5, about 0.2-0.4, about 0.2-0.3, about 0.3-0.5, about 0.3-0.4, or about 0.4-0.5. In some embodiments, x is about 0.5.

In some embodiments, a is about 0.1-0.5, about 0.1-0.4, about 0.1-0.3, about 0.1-0.2, about 0.2-0.5, about 0.2-0.4, about 0.2-0.3, about 0.3-0.5, about 0.3-0.4, or about 0.4-0.5. In some embodiments, a is about 0.3.

In some embodiments, b is about 0.01-0.5, about 0.01-0.2, about 0.05-0.5, about 0.05-0.4, about 0.05-0.3, about 0.05-0.2, about 0.1-0.5, about 0.1-0.4, about 0.1-0.3, about 0.2-0.5, about 0.2-0.4, or about 0.2-0.5. In some embodiments, b is about 0.2. In some embodiments, b is about 0.1.

The variable δ in the above compositions represents an oxygen deficiency and/or surplus in the composition. The value of δ is dependent on temperature and the oxidation state of calcium, chromium, copper, strontium, and molybdenum in the composition. Additionally, the value of δ may vary depending on the partial pressure of oxygen in the atmosphere and within the anode itself. In some embodiments, δ is about 0-1.5, about 0-1, about 0-0.5, about 0.5-1.5, or about 1.0-1.5. In some embodiments, δ is about 0.

In some embodiments, the oxide composition of formula (IV) is $$(Y_{0.5}Nd_{0.5})_{0.7}Ca_{0.3}Cr_{0.8}Cu_{0.2}O_{3\pm\delta}.$$

In some embodiments, where $M^1$ in formula I is Pr, $M^2$ in formula I is Ca, and $M^3$ in formula I is Cu, the oxide composition is of formula (V):

$$Pr_{(1-a)}Ca_aCr_{(1-b)}Cu_bO_{3\pm\delta} \qquad (V)$$

wherein:
 a is about 0.1-0.5;
 b is about 0.01-0.2; and
 0≤δ≤1.5.

In some embodiments, a is about 0.1-0.5, about 0.1-0.4, about 0.1-0.3, about 0.1-0.2, about 0.2-0.5, about 0.2-0.4, about 0.2-0.3, about 0.3-0.5, about 0.3-0.4, or about 0.4-0.5. In some embodiments, a is about 0.3.

In some embodiments, b is about 0.01-0.5, about 0.01-0.2, about 0.05-0.5, about 0.05-0.4, about 0.05-0.3, about 0.05-

0.2, about 0.1-0.5, about 0.1-0.4, about 0.1-0.3, about 0.2-0.5, about 0.2-0.4, or about 0.2-0.5. In some embodiments, b is about 0.2. In some embodiments, b is about 0.1.

The variable δ in the above compositions represents an oxygen deficiency and/or surplus in the composition. The value of δ is dependent on temperature and the oxidation state of calcium, chromium, copper, strontium, and molybdenum in the composition. Additionally, the value of δ may vary depending on the partial pressure of oxygen in the atmosphere and within the anode itself. In some embodiments, δ is about 0-1.5, about 0-1, about 0-0.5, about 0.5-1.5, or about 1.0-1.5. In some embodiments, δ is about 0.

In some embodiments, the oxide composition of formula (V) is $$Pr_{0.7}Ca_{0.3}Cr_{0.8}Cu_{0.2}O_{3\pm\delta}.$$

In some embodiments, where $M^1$ in formula I is La, $M^2$ in formula I is Sr, and $M^3$ in formula I is Cu, the oxide composition is of formula (V):

$$La_{(1-a)}Sr_aCr_{(1-b)}Mo_bO_{3\pm\delta} \quad (V)$$

wherein:
a is about 0.1-0.5;
b is about 0.01-0.2; and
$0 \leq \delta \leq 1.5$.

In some embodiments, a is about 0.1-0.5, about 0.1-0.4, about 0.1-0.3, about 0.1-0.2, about 0.2-0.5, about 0.2-0.4, about 0.2-0.3, about 0.3-0.5, about 0.3-0.4, or about 0.4-0.5. In some embodiments, a is about 0.4.

In some embodiments, b is about 0.01-0.5, about 0.01-0.2, about 0.05-0.5, about 0.05-0.4, about 0.05-0.3, about 0.05-0.2, about 0.1-0.5, about 0.1-0.4, about 0.1-0.3, about 0.2-0.5, about 0.2-0.4, or about 0.2-0.5. In some embodiments, b is about 0.2. In some embodiments, b is about 0.1.

The variable δ in the above compositions represents an oxygen deficiency and/or surplus in the composition. The value of δ is dependent on temperature and the oxidation state of calcium, chromium, copper, strontium, and molybdenum in the composition. Additionally, the value of δ may vary depending on the partial pressure of oxygen in the atmosphere and within the anode itself. In some embodiments, δ is about 0-1.5, about 0-1, about 0-0.5, about 0.5-1.5, or about 1.0-1.5. In some embodiments, δ is about 0.

In some embodiments, the oxide composition of formula (V) is $$La_{0.6}Sr_{0.4}Cr_{0.8}Mo_{0.1}O_{3\pm\delta}.$$

In some embodiments, the present invention provides a solid oxide fuel cell (SOFC) comprising:
(a) a cathode layer;
(b) an electrolyte layer; and
(c) an anode layer comprising an oxide composition.

In some embodiments, the present invention provides a solid oxide fuel cell (SOFC) comprising:
(a) a cathode layer;
(b) an electrolyte layer; and
(c) an anode layer comprising an oxide composition of formula (I):

$$M^1_{(1-a)}M^2_aCr_{(1-b)}M^3_bO_{3\pm\delta} \quad (I)$$

wherein:
$M^1$ is a metal selected from the group consisting of Y, Nd, Pr, La, and a combination thereof;
$M^2$ is a metal selected from the group consisting of Ca and Sr;
$M^3$ is a metal selected from the group consisting of Cu and Mo;
a is about 0.1-0.5;
b is about 0.01-0.2; and
$0 \leq \delta \leq 1.5$.

In some embodiments, the solid oxide fuel cell comprises a cathode layer. In some embodiments, the materials that can be used for the cathode layer include, but are not limited to, composite materials having (1) a material selected from the group consisting of lanthanum strontium cobalt oxide (LSC), barium strontium cobalt iron oxide (BSCF), samarium strontium cobalt iron oxide (SSCF), samarium strontium cobalt oxide (SSC), and lanthanum strontium manganate (LSM); and (2) a material selected from the group consisting of: yttria stabilized zirconia (YSZ), scandia stabilized zirconia (SSZ), gadolinia doped ceria (GDC), samaria doped ceria (SDC), samaria-neodymium doped ceria (SNDC), erbia stabilized bismuth oxide (ESB), dysprosium tungsten stabilized bismuth oxide (DWSB), yttria stabilized bismuth oxide (YSB), and strontium and magnesium doped lanthanum gallate (LSGM). In some embodiments, the material used for the cathode layer comprises GDC.

In some embodiments, the cathode layer may be composed of a single material selected from the group consisting of lanthanum strontium cobalt oxide (LSC), barium strontium cobalt iron oxide (BSCF), samarium strontium cobalt iron oxide (SSCF), lanthanum strontium manganate (LSM). In another embodiment, the cathode layer may comprise yttria stabilized zirconia (YSZ), scandia stabilized zirconia (SSZ), gadolinia doped ceria (GDC), samaria doped ceria (SDC), samaria-neodymium doped ceria (SNDC), erbia stabilized bismuth oxide (ESB), dysprosium tungsten stabilized bismuth oxide (DWSB), yttria stabilized bismuth oxide (YSB), and strontium and magnesium doped lanthanum gallate (LSGM).

In some embodiments, the solid oxide fuel cell comprises an electrolyte layer. In some embodiments, the materials that can used for the electrolyte layer include, but are not limited to, yttria stabilized zirconia (YSZ), scandia stabilized zirconia (SSZ), gadolinia doped ceria (GDC), samaria doped ceria (SDC), samaria-neodymium doped ceria (SNDC), erbia stabilized bismuth oxide (ESB), yttria stabilized bismuth oxide (YSB), strontium and magnesium doped lanthanum gallate (LSGM), and combinations thereof. The electrolyte layer in some embodiments may also include multiple dopants and stabilizers. In some embodiments, the electrolyte layer comprises GDC.

In some embodiments, the solid oxide fuel cell comprises an anode layer. In some embodiments, the anode layer comprises an chromate based oxide composition. In some embodiments, the anode layer comprises various compositions of chromate based oxides. Chromate based oxide compositions have been found to be compatible with inter mediate- and low-temperature SOFCs and provide high conductivity, reduction-oxidation stability, and compatibility with hydrocarbon and sulfur-containing fuels. Furthermore, these materials avoid drawbacks associated with traditional Ni-based oxide anode materials.

Solid oxide fuel cells comprising chromate based oxides as anode materials have high electronic conductivity when reduced at low temperatures. Being able to reduce the anode layer at low temperatures reduces damage to other layers within the fuel cell that may be sensitive to temperature. Such temperature sensitive layers may include the electrolyte layer and/or the cathode layer. According to some embodiments, chromate based oxide anode materials have high conductivity when reduced at a temperature that is similar to the operating temperature of the solid oxide fuel cell. If a material can be reduced at temperatures similar to the operating temperature of the solid oxide fuel cell, the anode layer can be reduced in situ, meaning that a separate reducing operation during the fabrication of the solid oxide fuel cell is unnecessary. In some embodiments, the anode material has a high conductivity when reduced at a temperature of less than 850° C. In some embodiments, the anode material has a high conductivity when reduced at a temperature of less than 650° C. In some embodiments, the anode material is reduced in situ.

In some embodiments, the crystal structure of the anode layer is perovskite. In some embodiments, the anode layer includes only oxide materials.

In some embodiments, the anode layer has a conductivity of at least 2.6 S/cm when measured at a temperature less than 850° C. In some embodiments, the anode layer has a conductivity of at least 1 S/cm when measured at a temperature less than 650° C. In some embodiments, the anode layer has a conductivity between 1 S/cm and 100 S/cm, 1 S/cm and 50 S/cm, 1 S/cm and 40 S/cm, 1 S/cm and 35 S/cm, 1 S/cm and 30 S/cm, 1 S/cm and 10 S/cm, 1 S/cm and 2.5 S/cm, 2.5 S/cm and 100 S/cm, 2.5 S/cm and 50 S/cm, 2.5 S/cm and 40 S/cm, 2.5 S/cm and 35 S/cm, 2.5 S/cm and 30 S/cm, 2.5 S/cm and 10 S/cm, 10 S/cm and 100 S/cm, 10 S/cm and 50 S/cm, 10 S/cm and 40 S/cm, 10 S/cm and 35 S/cm, 10 S/cm and 30 S/cm, 30 S/cm and 100 S/cm, 30 S/cm and 50 S/cm, 30 S/cm and 40 S/cm, 30 S/cm and 35 S/cm, 35 S/cm and 100 S/cm, 35 S/cm and 50 S/cm, 35 S/cm and 40 S/cm, 40 S/cm and 100 S/cm, 40 S/cm and 50 S/cm, or 50 S/cm and 100 S/cm when measured at a temperature less than 850° C. In some embodiments, the anode layer has a conductivity between 1 S/cm and 100 S/cm, 1 S/cm and 50 S/cm, 1 S/cm and 40 S/cm, 1 S/cm and 35 S/cm, 1 S/cm and 30 S/cm, 1 S/cm and 10 S/cm, 1 S/cm and 2.5 S/cm, 2.5 S/cm and 100 S/cm, 2.5 S/cm and 50 S/cm, 2.5 S/cm and 40 S/cm, 2.5 S/cm and 35 S/cm, 2.5 S/cm and 30 S/cm, 2.5 S/cm and 10 S/cm, 10 S/cm and 100 S/cm, 10 S/cm and 50 S/cm, 10 S/cm and 40 S/cm, 10 S/cm and 35 S/cm, 10 S/cm and 30 S/cm, 30 S/cm and 100 S/cm, 30 S/cm and 50 S/cm, 30 S/cm and 40 S/cm, 30 S/cm and 35 S/cm, 35 S/cm and 100 S/cm, 35 S/cm and 50 S/cm, 35 S/cm and 40 S/cm, 40 S/cm and 100 S/cm, 40 S/cm and 50 S/cm, or 50 S/cm and 100 S/cm when measured at a temperature less than 650° C. In some embodiments, the anode layer has a conductivity between 1 S/cm and 100 S/cm, 1 S/cm and 50 S/cm, 1 S/cm and 40 S/cm, 1 S/cm and 35 S/cm, 1 S/cm and 30 S/cm, 1 S/cm and 10 S/cm, 1 S/cm and 2.5 S/cm, 2.5 S/cm and 100 S/cm, 2.5 S/cm and 50 S/cm, 2.5 S/cm and 40 S/cm, 2.5 S/cm and 35 S/cm, 2.5 S/cm and 30 S/cm, 2.5 S/cm and 10 S/cm, 10 S/cm and 100 S/cm, 10 S/cm and 50 S/cm, 10 S/cm and 40 S/cm, 10 S/cm and 35 S/cm, 10 S/cm and 30 S/cm, 30 S/cm and 100 S/cm, 30 S/cm and 50 S/cm, 30 S/cm and 40 S/cm, 30 S/cm and 35 S/cm, 35 S/cm and 100 S/cm, 35 S/cm and 50 S/cm, 35 S/cm and 40 S/cm, 40 S/cm and 100 S/cm, 40 S/cm and 50 S/cm, or 50 S/cm and 100 S/cm when measured at a temperature of 550° C. In some embodiments, the anode layer has a conductivity between 1 S/cm and 100 S/cm, 1 S/cm and 50 S/cm, 1 S/cm and 40 S/cm, 1 S/cm and 35 S/cm, 1 S/cm and 30 S/cm, 1 S/cm and 10 S/cm, 1 S/cm and 2.5 S/cm, 2.5 S/cm and 100 S/cm, 2.5 S/cm and 50 S/cm, 2.5 S/cm and 40 S/cm, 2.5 S/cm and 35 S/cm, 2.5 S/cm and 30 S/cm, 2.5 S/cm and 10 S/cm, 10 S/cm and 100 S/cm, 10 S/cm and 50 S/cm, 10 S/cm and 40 S/cm, 10 S/cm and 35 S/cm, 10 S/cm and 30 S/cm, 30 S/cm and 100 S/cm, 30 S/cm and 50 S/cm, 30 S/cm and 40 S/cm, 30 S/cm and 35 S/cm, 35 S/cm and 100 S/cm, 35 S/cm and 50 S/cm, 35 S/cm and 40 S/cm, 40 S/cm and 100 S/cm, 40 S/cm and 50 S/cm, or 50 S/cm and 100 S/cm when measured at a temperature of 500° C.

In some embodiments, the anode layer comprises a chromate-based oxide. In some embodiments, the anode layer comprises a chromate-based oxide selected from the group consisting of $Y_{0.7}Ca_{0.3}Cr_{0.8}Cu_{0.2}O_{3-\delta}$, $Nd_{0.7}Ca_{0.3}Cr_{0.8}Cu_{0.2}O_{3-\delta}$, $(Y_{0.5}Nd_{0.5})_{0.7}Ca_{0.3}Cr_{0.8}Cu_{0.2}O_{3-\delta}$, $Pr_{0.7}Ca_{0.3}Cr_{0.8}Cu_{0.2}O_{3-\delta}$, and $La_{0.6}Sr_{0.4}Cr_{0.9}Mo_{0.1}O_{3-\delta}$. In some embodiments, the anode layer comprises $Y_{0.7}Ca_{0.3}Cr_{0.8}Cu_{0.2}O_{3-\delta}$. In some embodiments, the anode layer comprises $Nd_{0.7}Ca_{0.3}Cr_{0.8}Cu_{0.2}O_{3-\delta}$. In some embodiments, the anode layer comprises $(Y_{0.5}Nd_{0.5})_{0.7}Ca_{0.3}Cr_{0.8}Cu_{0.2}O_{3-\delta}$. In some embodiments, the anode layer comprises $Pr_{0.7}Ca_{0.3}Cr_{0.8}Cu_{0.2}O_{3-\delta}$. In some embodiments, the anode layer comprises $La_{0.6}Sr_{0.4}Cr_{0.9}Mo_{0.1}O_{3-\delta}$.

In some embodiments, the solid oxide fuel cell comprises a cathode functional layer. In some embodiments, the cathode functional layer improves the performance of the cathode layer. In some embodiments, the material that can be used for cathode functional layer disposed over the electrolyte layer include, but are not limited to, $La_{0.6}Sr_{0.4}CoO_3$ (LSC), $La_{0.65}Sr_{0.5}Co_2O_5$ (LSM), $La_{0.6}Sr_{0.4}CO_{0.2}Fe_{0.8}O_{3-\delta}$, $La_{0.6}Sr_{0.4}Co_{0.2}Fe_{0.8}O_{3-\delta}$ (LSCF), $La_{0.8}Sr_{0.2}Cu_{0.9}Fe_{0.1}O_{2.5}$ (LSCuF), $La_{0.7}Sr_{0.3}CoO_3$ (LSC), $Sm_{0.5}Sr_{0.5}CoO_3$ (SSC), $SmBa_{0.5}Sr_{0.5}Co_2O_5$ (SBSC), $GdSrCo_2O_5$ (GSC), $LaBaCo_2O_5$ (LBC), $YBaCo_2O_5$ (YBC), $Nd_{1.8}Ce_{0.2}CuO_4$ (NCC), $La_{0.8}Sr_{0.2}Co_{0.3}Mn_{0.1}Fe_{0.6}O_3$ (LSCFM), $La_{0.98}Ni_{0.6}Fe_{0.4}O_3$ (LNF), $La_{1.2}Sr_{0.8}NiO_4$ (LSN), $La_{0.7}Sr_{0.3}FeO_3$ (LSF), $La_2Ni_{0.6}Cu_{0.4}O_4$ (LNC), silver, and their composites. The above compounds are listed in their stoichiometric ratios, but as appreciated by one of ordinary skill in the art, the atomic ratios may vary slightly. Furthermore, while some of these compounds may require a high firing temperature, it is appreciated that modifiers may be used to lower the firing temperature of these materials for use in intermediate- and low-temperature solid oxide fuel cells.

In some embodiments, the solid oxide fuel cell comprises an anode functional layer. An anode functional layer is a separate anode layer with finer particle sizes to increase specific surface area, thereby increasing the electrochemical reaction rate at the interface between anode layer and electrolyte layer. In some embodiments, the anode functional layer is less porous than the rest of the anode layer. This may be achieved by controlling particle distribution and/or particle/solvent/binder ratios. In some embodiments, the anode functional layer is made of the same material as the anode layer itself. In some embodiments, the anode functional layer is made of a material that is different from the anode layer itself, such as Ni-GDC, Ni-perovskite, or with similar materials where Ni in replaced with a different metal.

In some embodiments, the solid oxide fuel cell may also comprise structures for blocking the diffusion of mobile dopant materials, e.g. copper or molybdenum, out of the chromate-based oxide material, while maintaining the functionality of the chromate-based oxide material as part of the SOFC. The diffusion of mobile dopant materials into an electrolyte layer can decrease the conductivity of the electrolyte layer and reduce the efficiency of the SOFC. Copper or molybdenum diffusions can also decrease the mechanical strength of the electrolyte layer and result in the formation of a phase or phases that cause high interfacial resistance between the anode layer and the electrolyte.

Fabrication of Solid Oxide Fuel Cells Using a Chromate Based Oxide Anode

In some embodiments, the present invention provides a method of making a solid oxide fuel cell comprising a cathode layer, an electrolyte layer, and an anode layer, wherein the anode layer comprises a chromate based oxide composition comprising:

(a) fabricating the cathode layer, the electrolyte layer, and the anode layer; and
(b) forming a complete cell with the fabricated layers in (a).

In some embodiments, the temperature of any subsequent fabrication steps, and the operating temperature of the solid oxide fuel cell, does not exceed 1100° C. In some embodiments, the temperature of any subsequent fabrication steps, and the operating temperature of the solid oxide fuel cell, does not exceed 1000° C.

In some embodiments, the present invention provides a method of making a solid oxide fuel cell comprising a cathode layer, a cathode functional layer, an electrolyte layer, and an anode layer, wherein the anode layer comprises a strontium iron cobalt molybdenum composition comprising:

(a) fabricating the cathode layer, the cathode functional layer, the electrolyte layer, and the anode layer; and
(b) forming a complete cell with the fabricated layers in (a).

In some embodiments, the temperature of any subsequent fabrication steps, and the operating temperature of the solid oxide fuel cell, does not exceed 1100° C. In some embodiments, the temperature of any subsequent fabrication steps, and the operating temperature of the solid oxide fuel cell, does not exceed 1000° C. In some embodiments, the temperature of any subsequent steps, and the operating temperature of the solid oxide fuel cell, does not exceed 600° C.

In some embodiments, the electronic conducting chromate based oxide anode material was combined with pyrolyzable pore formers to facilitate adequate fuel diffusion through the ceramic anode after firing. In some embodiments, the pyrolyzable pore former is a poly(methyl methacrylate) (PMMA) pore-former.

While the method of Example 2 describes fabricating four layers (anode, electrolyte, cathode functional layer, and cathode), it is appreciated that the completed fuel cell may include any number of additional layers. For example, but not limited thereto, the completed fuel cell may include a metallic contact layer and/or an electrolyte layer having two layers (i.e. electrolyte bilayer).

In some embodiments, the chromate based oxide is reduced before fabrication of the anode layer. It is preferable that the reduction temperature for the anode layer be keep as low as possible within the ranges described above, while still achieving sufficient oxygen removal and conductivity. Low reduction temperature is preferred because other layers in the fuel cell may be susceptible to temperature, thus resulting in, for example, atomic diffusion, annealing, and/or phase changes within or between the other layers. A high reducing temperature that alters this microstructure may be detrimental to the conductivity of the anode layer and the operating efficiency of the fuel cell. In some embodiments, the chromate based oxide is not reduced before fabrication of the anode layer.

In some embodiments, the anode layer of the completed fuel cell is not reduced in in the completed fuel cell, but is reduced in situ instead. In other words, the anode layer is reduced during fuel cell operation. Since the anode layer is capable of being reduced at a temperature no higher than the processing temperature, in situ reduction of the anode layer is possible. In situ reduction of the anode layer of the completed fuel cell decreases processing costs.

In addition to reducing the anode layer, additional processing steps may be performed on the completed fuel cell. In some embodiments, additional processing steps are not performed at temperatures that exceed 1100° C. In some embodiments, additional processing steps are not performed at temperatures that exceed 1000° C. Additional processing temperatures may be performed at any appropriate temperature, including temperatures as low as 0° C.

In some embodiments, the operating temperature of the SOFC does not exceed 850° C. In some embodiments, the operating temperature of the SOFC does not exceed 650° C. In some embodiments, the operating temperature of the SOFC is at least 350° C. to ensure efficient performance of the SOFC. In some embodiments, the operating temperature of the SOFC is between 350° C. and 850° C., 350° C. and 650° C., 350° C. and 550° C., 350° C. and 450° C., 450° C. and 850° C., 450° C. and 650° C., 450° C. and 550° C., 550° C. and 850° C., 550° C. and 650° C., or 650° C. and 850° C. In some embodiments, the operating temperature of the SOFC is between 450° C. and 650° C.

Power density is the amount of power (time rate of energy transfer) per unit volume. In some embodiments, the power density of the SOFC is high. In some embodiments, the high peak power density of the SOFC is between 300 $mW/cm^2$ and 800 $mW/cm^2$, 300 $mW/cm^2$ and 600 $mW/cm^2$, 300 $mW/cm^2$ and 500 $mW/cm^2$, 500 $mW/cm^2$ and 800 $mW/cm^2$, 500 $mW/cm^2$ and 600 $mW/cm^2$, or 600 $mW/cm^2$ and 800 $mW/cm^2$ when measured at 500° C. In some embodiments, the high peak power density of the SOFC is between 300 $mW/cm^2$ and 1200 $mW/cm^2$, 300 $mW/cm^2$ and 600 $mW/cm^2$, 300 $mW/cm^2$ and 500 $mW/cm^2$, 500 $mW/cm^2$ and 1200 $mW/cm^2$, 500 $mW/cm^2$ and 600 $mW/cm^2$, or 600 $mW/cm^2$ and 1200 $mW/cm^2$ when measured at 550° C. In some embodiments, the high peak power density of the SOFC is between 300 $mW/cm^2$ and 1400 $mW/cm^2$, 300 $mW/cm^2$ and 600 $mW/cm^2$, 300 $mW/cm^2$ and 500 $mW/cm^2$, 500 $mW/cm^2$ and 1400 $mW/cm^2$, 500 $mW/cm^2$ and 600 $mW/cm^2$, or 600 $mW/cm^2$ and 1400 $mW/cm^2$ when measured at 600° C.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

EXAMPLES

The following examples are illustrative and non-limiting of the electrochemical cells, methods of making, and methods of using described herein. Suitable modifications and adaptations of the variety of conditions, formulations and other parameters normally encountered in the field and which are obvious to those skilled in the art in view of this disclosure are within the spirit and scope of the invention.

Example 1

A standard solid-state route was used to synthesize $Y_{0.7}Ca_{0.3}Cr_{1-x}Cu_xO_{3-\delta}$ (x=0, 0.05, 0.12 and 0.20) anode materials. Stoichiometric amounts of yttrium oxide ($Y_2O_3$, Alfa Aesar, Havermill, Mass.), calcium carbonate ($CaCO_3$, Sigma-Aldrich), chromium oxide ($Cr_2O_3$, Inframet-Advanced Materials) and copper oxide (CuO, Alfa Aesar) were ball-milled for 24 hours in ethanol. The mixed oxides were then dried to evaporate ethanol and heat-treated at 1050° C. for 6 hours resulting in perovskite type oxide. The resulting phase was determined using a Bruker D8 powder X-ray diffractometer (XRD) with Cu Kα radiation. The unit cell parameters were obtained using Le Bail fitting procedure (TOPAS software) considering the orthorhombic structure with a space group pmmm. In order to investigate the compatibility between the $Y_{0.7}Ca_{0.3}Cr_{0.88}Cu_{0.12}O_{3-\delta}$ anode and the GDC electrolyte, respective powders were mixed in the ratio of 1:1 wt. % and compacted using a hydraulic press. The powder compactions were sintered at 1000° C., 1100° C., and 1200° C. and the sintered pellets were used to obtain the XRD patterns.

The samples for DC conductivity determination were prepared by sintering the powder compacts at 1350° C. for 4 hours in air. The densities of the sintered samples were determined by Archimedes principle (buoyancy method) using Mettler Toledo's Density Kit. The shrinkage measurements were made by measuring the geometrical changes before and after sintering. DC electrical conductivity measurements were performed on fully sintered $Y_{0.7}Ca_{0.3}Cr_{1-x}Cu_xO_{3-\delta}$ rectangular bars. Silver wires and silver paste were used as leads and current collector, respectively, attached to a Keithley 2400 source meter. The measurements were made using a reactor capable of operating under reducing conditions. For electrical conductivity measurements in the range 400-650° C., the samples were heated up in $N_2$ and changed to humidified 10% $H_2$/87% $N_2$. Pure $H_2$ was not used for safety considerations. The samples were allowed to equilibrate in this gas condition at 650° C. over a period of 16 hours and the measurements were made at 50° C. intervals down to 400° C. 30 minutes of stabilization time was provided before taking the measurements at each interval. For the reduction-oxidation (redox) cycles, the sample was heated again to 650° C. in reducing gases 10% $H_2$/87% $N_2$/3% $H_2O$. The conductivity at various temperatures (down to 400° C.) and the time duration were monitored. Subsequently, the reactor was left in air at 650° C. and the respective conductivity value was monitored. The gas atmosphere was switched between reducing gases and air to determine the redox stability.

Example 2

SOFC Fabrication using a $Y_{0.7}Ca_{0.3}Cr_{1-x}Cu_xO_{3-\delta}$ Ceramic Oxide A new cathode-supported SOFC configuration was employed to determine the performance of $Y_{0.7}Ca_{0.3}Cr_{1-x}Cu_xO_{3-\delta}$ based ceramic oxide. The configuration consisted of thin, dense GDC sandwiched between porous GDC cathode support (400 μm) and $Y_{0.7}Ca_{0.3}Cr_{1-x}Cu_xO_{3-\delta}$ anode (60 μm). This SOFC configuration allows for lowered sintering temperature of $Y_{0.7}Ca_{0.3}Cr_{1-x}Cu_xO_{3-\delta}$ on GDC to 1000° C. as an unwanted reaction occurs between GDC and $Y_{0.7}Ca_{0.3}Cr_{1-x}Cu_xO_{3-\delta}$ at temperatures >1100° C. The catalytic activity in the electrodes was incorporated by solution infiltration technique.

For preparation of porous $Gd_{0.1}Ce_{0.9}O_{2-\delta}$ (GDC, Fuel Cell Materials) scaffold, tape-casting technique was used and the slurry was prepared by following the standard procedures. 30 μm of poly(methyl methacrylate) (PMMA) pore-former (24 wt. % to that of GDC content) was used in the tape-casting recipe to create sufficient porosity on the cathode side of the fuel cells. For making dense GDC tape, the slurry was formulated without the PMMA pore-former and tape-cast. Approximately 30 μm thick as-prepared GDC tape was laminated with PMMA-containing GDC green tapes (3 tapes to achieve the final thickness of 400 μm) using a hot press. The laminated tapes were stepwise heat-treated to burn out the PMMA pore-formers and organic binder, followed by sintering. The maximum firing temperature was 1450° C. for 4 hours. The half-cell that resulted consisted of 400 μm thick porous GDC scaffold and 23 μm-thick dense GDC electrolytes. The dense electrolyte side of the half-cell was then doctor blade coated with $Y_{0.7}Ca_{0.3}Cr_{1-x}Cu_xO_{3-\delta}$ screen printing ink and sintered at 1000° C. for 2 hour. The $Y_{0.7}Ca_{0.3}Cr_{1-x}Cu_xO_{3-\delta}$ ink was formulated using a commercial ink making vehicle (ESL ElectroScience, type 441) along with 10 μm PMMA pore-former (23 wt. % with respect to $Y_{0.7}Ca_{0.3}Cr_{1-x}Cu_xO_{3-\delta}$ solid) to obtain a porous microstructure.

The infiltration procedure for $La_{0.6}Sr_{0.4}CoO_{3-\delta}$ (LSC) was adopted from the research work described in Samson, A., et al., J. Electrochem. Soc. 158:B650-B659 (2011). 1 M of LSC precursor was prepared by dissolving nitrates of lanthanum, strontium, and cobalt in water with glycine as the complexing agent. A few drops of prepared solution were infiltrated into the porous GDC scaffold and placed in a vacuum chamber for 5 minutes. 600° C. heat-treatments between successive infiltrations were made to decompose nitrates and to form the LSC phase.

LSC loaded half cells were then infiltrated with NiO-GDC on the anode side. 0.75M of NiO-GDC ($Ce_{0.9}Gd_{0.1}O_{2-\delta}$) precursor was prepared by dissolving nitrates of nickel, cerium, and gadolinium in water. An infiltration procedure similar to that used for LSC was followed for NiO-GDC. Between each successive infiltration step, the sample was heat-treated at 400° C. for an hour to decompose the nitrate salts.

Example 3

Properties of SOFC

The solid oxide fuel cells prepared in Example 2 were tested to determine their properties.

FIG. 1 shows the x-ray diffraction (XRD) patterns of $Y_{0.7}Ca_{0.3}Cr_{1-x}Cu_xO_{3-\delta}$ (x=0, 0.05, 0.12, and 0.20) and indicates a perovskite oxide phase with orthorhombic symmetry. It is expected that $Cu^{2+}$ preferably substitutes for $Cr^{3+}$ at the B-site of the pervoskite oxide, mainly because the ionic radius of $Cu^{2+}$ (0.073 nm) is comparable to $Cr^{3+}$ (0.062 nm). Some phase segregation from Cu-excess oxides (x=0.20) was evident from the XRD data (indicated by an arrow mark).

Figure 2:
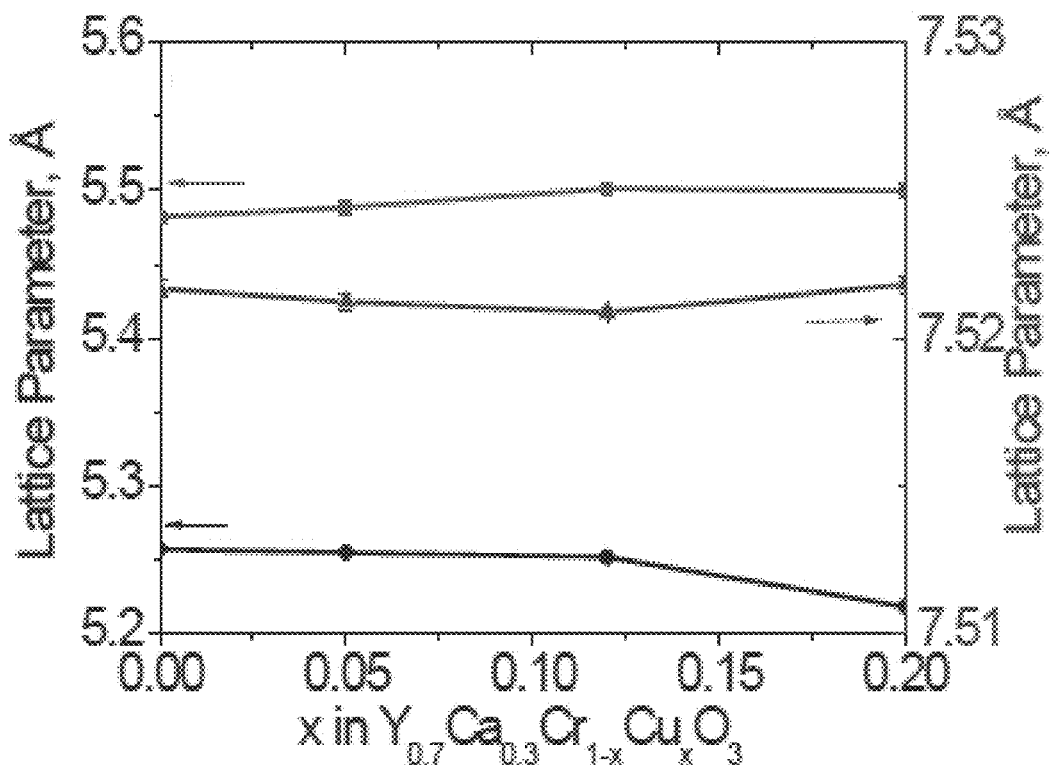
FIG. 2 a graph of the lattice parameter of $Y_{0.7}Ca_{0.3}Cr_{1-x}Cu_xO_{3-\delta}$, (x=0, 0.05, 0.12, and 0.20) as a function of dopant concentration. The lattice parameters calculated from the XRD data changes with the doping level.
Figure 3:
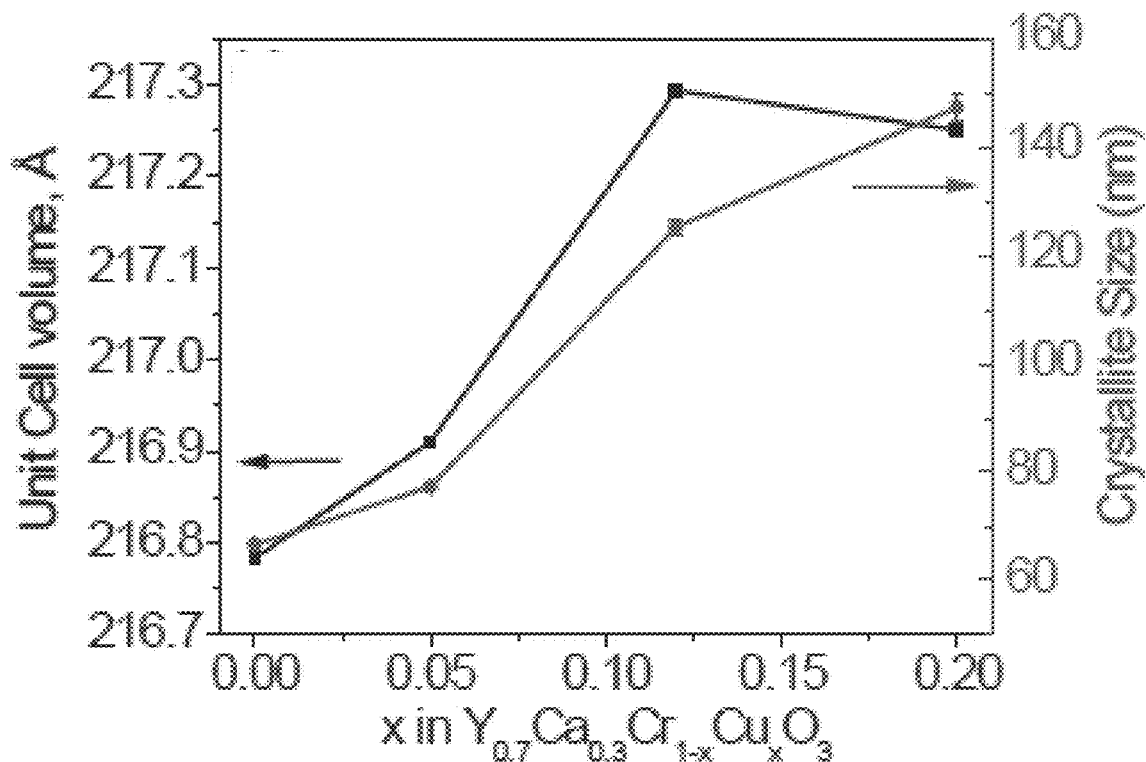
FIG. 3 is a graph of the unit cell volume and crystallite size of $Y_{0.7}Ca_{0.3}Cr_{1-x}Cu_xO_{3-\delta}$, (x=0, 0.05, 0.12, and 0.20) as a function of dopant concentration.

FIG. 2 and FIG. 3 show the lattice parameters, unit cell volume, and crystallite size of $Y_{0.7}Ca_{0.3}Cr_{1-x}Cu_xO_{3-\delta}$ as a function of dopant concentration. As seen in FIG. 2, the lattice parameters calculated from the XRD data changes with the doping level and the impact of these changes can be inferred from the unit cell volume. As shown in FIG. 3, the unit cell volume increases gradually with the increase in Cu dopant concentration until x≈0.12. This can be attributed to the slightly higher ionic radius of $Cu^{2+}$ that was substituted for $Cr^{3+}$. For dopant concentrations x>0.12, a decrease in unit cell volume illustrates a deviation of Vegard-type behavior, indicating the solubility limit of Cu in the perovskite oxide at x<0.12 (Qasim, I., et al., *Inorg. Chem.* 53:2240-2247 (2014)). This observation is consistent with our XRD data showing impurity phases for the composition x=0.20. The crystallite sizes gradually increase with doping concentration due to grain growth. Consistent with this observation, the relative density of the samples increased with Cu-doping. The density of 1350° C. sintered samples was 59%, 90%, 92%, and 98% for 0%, 5%, 12%, and 20% Cu-doping levels, respectively. A linear shrinkage of 5.6, 14.9, 18.6, and 21% was observed for 0%, 5%, 12%, and 20% $Y_{0.7}Ca_{0.3}Cr_{1-x}Cu_xO_{3-\delta}$, respectively. A similar behavior was shown in Yoon, K. J., et al., *Electrochemical and Solid-State Letters* 13:B101-B105 (2010), that addition of Cu not only improve the shrinkage characteristics but also facilitated the densification of $Y_{0.7}Ca_{0.3}Cr_{0.9}Cu_{0.1}O_{3-\delta}$ due to enhanced grain growth.

Figure 4:
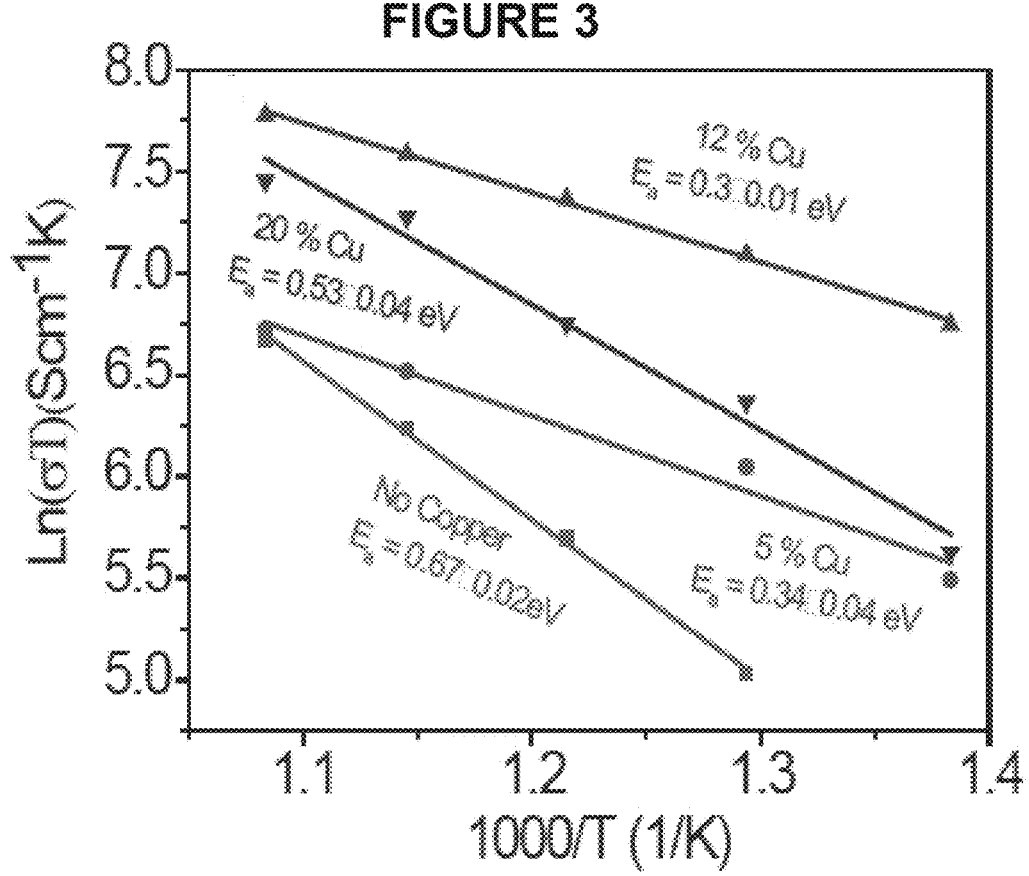
FIG. 4 is a graph of the temperature dependence of $Y_{0.7}Ca_{0.3}Cr_{1-x}Cu_xO_{3-\delta}$, (x=0 (No Copper), 0.05 (5% Cu), 0.12 (12% Cu), and 0.20 (20% Cu)) in reducing gas conditions (humidified 10% $H_2/N_2$-containing gas). A linear increase in conductivity with temperature illustrates a thermally activated electrical conduction mechanism through hopping of polarons.

FIG. 4 shows the temperature dependence of electrical conductivity of $Y_{0.7}Ca_{0.3}Cr_{1-x}Cu_xO_{3-\delta}$ with and without Cu as a dopant in reducing gas conditions. A linear increase in conductivity with temperature illustrates a thermally activated electrical conduction mechanism through hopping of polarons. A relatively high activation energy of 0.67 eV was obtained for the Cu-free sample. On the other hand, the activation energy obtained for 5% Cu-doped sample was 0.34 eV, which is a 45% reduction compared to the Cu-free sample. With the incremental Cu-doping concentration of 12%, the value further decreased to 0.3 eV. For Cu-doping concentration of 20%, the activation energy increased to 0.53 eV impacted by the presence of dual phase impurities. Electrical conductivity in the Cu-free sample is achieved by substitution of $Ca^{2+}$ in the $Y^{3+}$ site, so that acceptor doping is electronically compensated by $Cr^{3+}$ to $Cr^{4+}$ transition.

Figure 5:
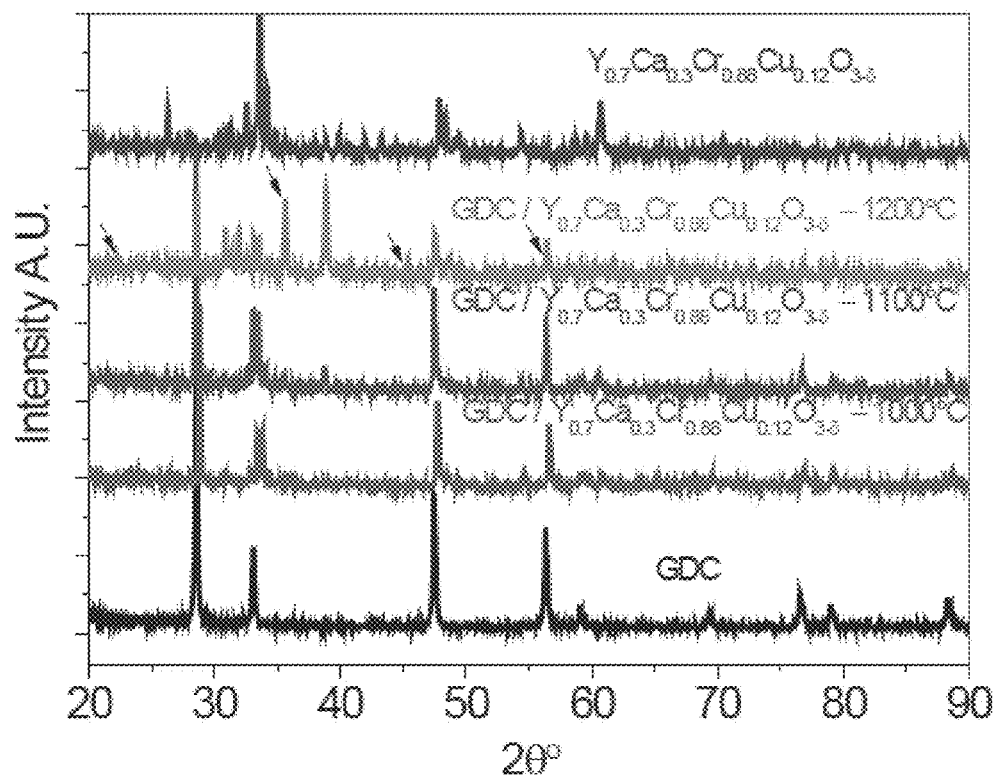
FIG. 5 is a graph XRD patterns of $Y_{0.7}Ca_{0.3}Cr_{0.88}Cu_{0.12}O_{3-\delta}$, a composite of GDC and $Y_{0.7}Ca_{0.3}Cr_{0.88}Cu_{0.12}O_{3-\delta}$ calcined at 1200° C., a composite of gadolinium-doped ceria (GDC) and $Y_{0.7}Ca_{0.3}Cr_{0.88}Cu_{0.12}O_{3-\delta}$ calcined at 1100° C., a composite of GDC and $Y_{0.7}Ca_{0.3}Cr_{0.88}Cu_{0.12}O_{3-\delta}$ calcined at 1000° C., and GDC. The secondary phases are indicated by arrow marks.

XRD characterization was used to investigate the compatibility between $Y_{0.7}Ca_{0.3}Cr_{0.88}Cu_{0.12}O_{3-\delta}$ and GDC. FIG. 5 shows the XRD patterns for GDC, $Y_{0.7}Ca_{0.3}Cr_{0.88}Cu_{0.12}O_{3-\delta}$, and a composite of $Y_{0.7}Ca_{0.3}Cr_{0.88}Cu_{0.12}O_{3-\delta}$ and GDC. Single phase $Y_{0.7}Ca_{0.3}Cr_{0.88}Cu_{0.12}O_{3-\delta}$ and GDC composite anode powders as starting materials was sintered at 1000° C., 1100° C., and 1200° C. for 4 hours in air. The XRD patterns of composites were compared with pristine GDC and $Y_{0.7}Ca_{0.3}Cr_{0.88}Cu_{0.12}O_{3-\delta}$ powders. According to the XRD patterns, single orthorhombic phase of $Y_{0.7}Ca_{0.3}Cr_{0.88}Cu_{0.12}O_{3-\delta}$ anode and fluorite phase of GDC was maintained for the composite samples sintered at 1000° C. and 1100° C. This suggests no chemical reaction between $Y_{0.7}Ca_{0.3}Cr_{0.88}Cu_{0.12}O_{3-\delta}$ and GDC up to 1100° C. within the sensitivity of the XRD instrument. A similar observation was reported by Yan, K., et al., *Solid State Ionics* 288:88-93 (2016), for $Y_{0.7}Ca_{0.3}Cr_{0.8}Co_{0.2}O_3$ and GDC composite. However, for the sample fired at 1200° C., unknown secondary phase starts to appear (as indicated by arrow marks) affecting the basic structure of individual materials in the composite. This indicated that an upper limit on electrolyte sintering temperature on $Y_{0.7}Ca_{0.3}Cr_{0.88}Cu_{0.12}O_{3-\delta}$ would be 1100° C. Similarly, it was reported in Yan, K., et al., *Solid State Ionics* 288:88-93 (2016), that $Y_{0.7}Ca_{0.3}Cr_{0.8}Co_{0.2}O_3$ based materials reacts with YSZ electrolytes to form a unwanted interfacial layer (e.g., $CaZrO_3$) resulting in lower SOFC performance. Thus, the sintering temperature of $Y_{0.7}Ca_{0.3}Cr_{0.88}Cu_{0.12}O_{3-\delta}$ on GDC is fixed to 1000° C. to avoid any unwanted interfacial reactions.

Figure 6:
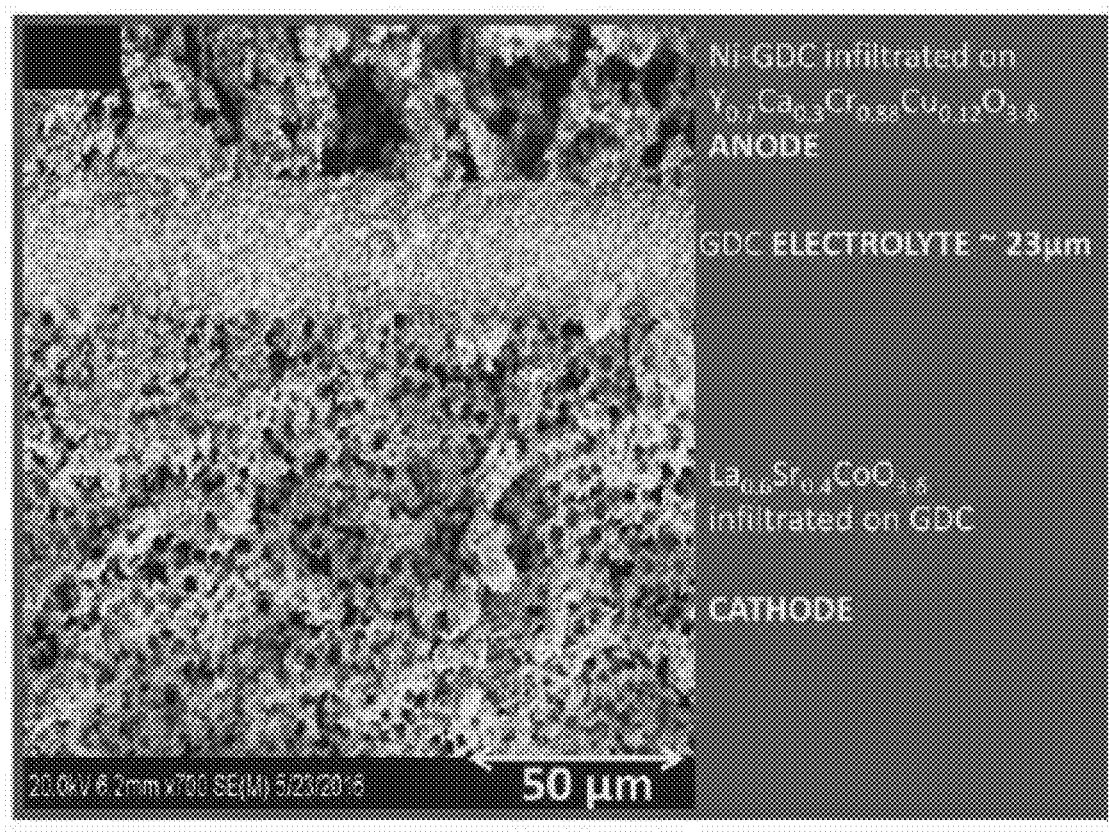
FIG. 6 is a cross sectional scanning electron microscope (SEM) image of a solid oxide fuel cell consisting of a porous GDC support and a $Y_{0.7}Ca_{0.3}Cr_{0.88}Cu_{0.12}O_{3-\delta}$ scaffold separated by a gas-tight GDC electrolyte.
Figure 7:
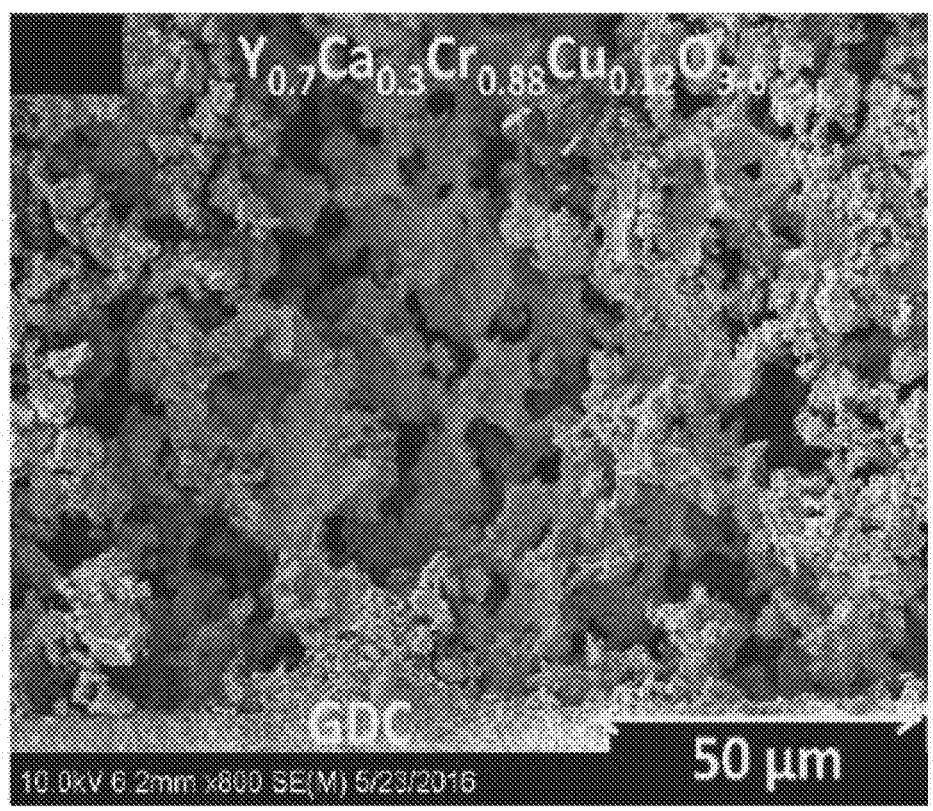
FIG. 7 is a cross sectional SEM image of a $Y_{0.7}Ca_{0.3}Cr_{0.88}Cu_{0.12}O_{3-\delta}$ anode and a GDC electrolyte.
Figure 8:
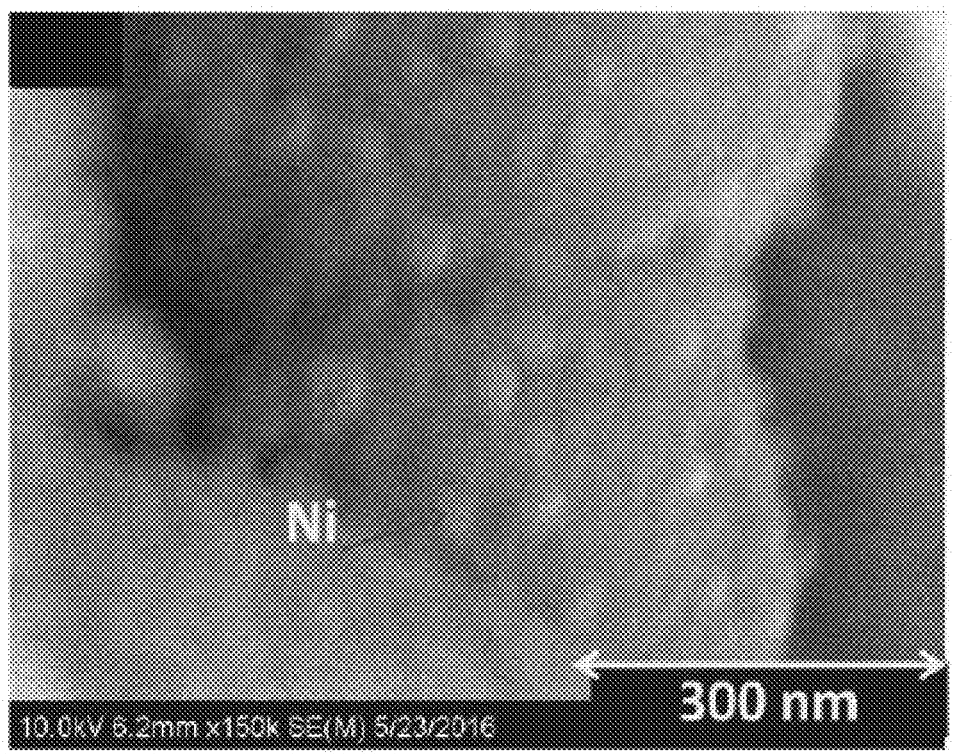
FIG. 8 is cross sectional SEM image of Ni nanoparticles decorating the surface of the $Y_{0.7}Ca_{0.3}Cr_{0.88}Cu_{0.12}O_{3-\delta}$ anode and are surrounded by nano-sized GDC. Ni and GDC in the anode side serve as a catalyst for hydrogen oxidation and oxide ion conduction, respectively, while the $Y_{0.7}Ca_{0.3}Cr_{0.88}Cu_{0.12}O_{3-\delta}$ scaffold facilitates current collection.

FIG. 6, FIG. 7, and FIG. 8 depict the microstructure of the SOFC prepared in Example 2. The SOFC consists of a porous GDC support and a $Y_{0.7}Ca_{0.3}Cr_{0.88}Cu_{0.12}O_{3-\delta}$ scaffold separated by a gas-tight, dense GDC electrolyte (~23 µm). FIG. 7 shows the SEM micrograph of the cross-section of $Y_{0.7}Ca_{0.3}Cr_{0.88}Cu_{0.12}O_{3-\delta}$ anode and GDC electrolyte. The $Y_{0.7}Ca_{0.3}Cr_{0.88}Cu_{0.12}O_{3-\delta}$ anode has a porous microstructure and was well bonded to the dense GDC electrolyte. Further, as shown in FIG. 8 (which is a magnified view of FIG. 7), Ni nanoparticles decorated the surface of the $Y_{0.7}Ca_{0.3}Cr_{0.88}Cu_{0.12}O_{3-\delta}$ anode and are surrounded by nano-sized GDC. Ni and GDC in the anode side serve as a catalyst for hydrogen oxidation and oxide ion conductor, respectively, while the $Y_{0.7}Ca_{0.3}Cr_{0.88}Cu_{0.12}O_{3-\delta}$ scaffold facilitates current collection. The catalytic activity of the Cu-free $Y_{0.7}Ca_{0.3}Cr_{0.88}Cu_{0.12}O_{3-\delta}$ sample in humidified 5% $H_2/N_2$ gas conditions at 850° C. was reported in Carini, G., et al., *Solid State Ionics* 49:233-243 (1991), where they observed a high electrode polarization of 230 $\Omega cm^2$, which illustrates $Y_{0.7}Ca_{0.3}Cr_{0.88}Cu_{0.12}O_{3-\delta}$ has negligible catalytic activity.

Figure 9:
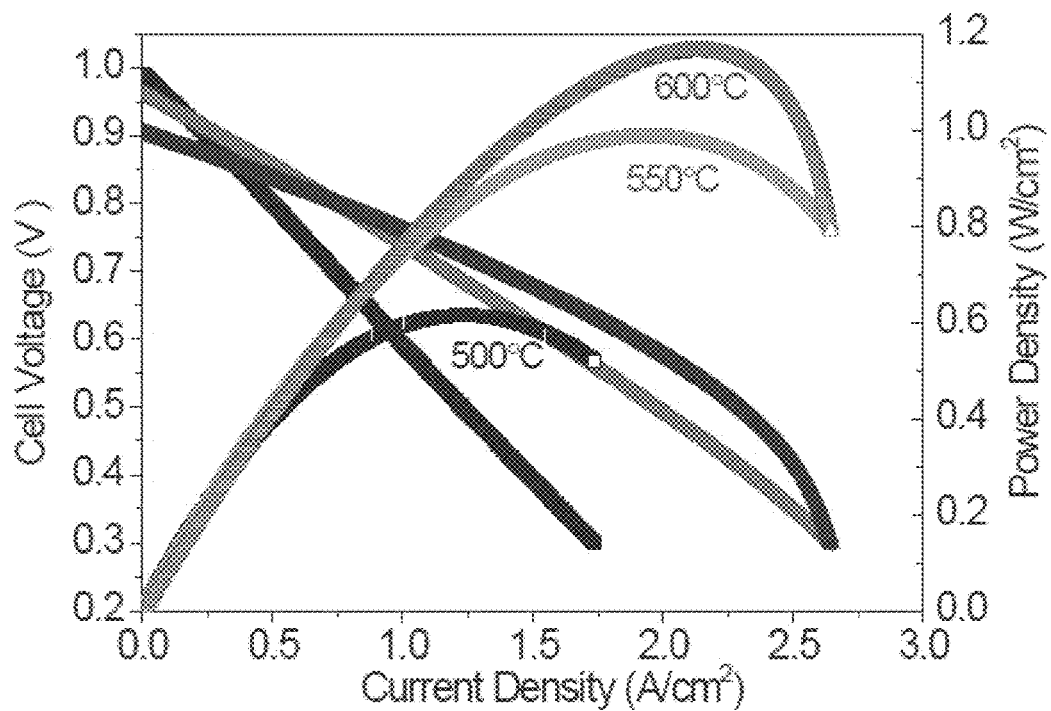
FIG. 9 is a graph of the I-V curves of a solid oxide fuel cell with $Y_{0.7}Ca_{0.3}Cr_{0.88}Cu_{0.12}O_{3-\delta}$ as the anode at 500° C., 550° C., and 600° C. measured in $H_2$/3% $H_2O$. High peak power densities of 1.2 W/cm² (2.2 A/cm²) was obtained at 600° C., of 1 W/cm² (2.0 A/cm²) was obtained at 550° C., and of 0.6 W/cm² (1.3 A/cm²) was obtained at 500° C.

FIG. 9 shows the I-V curves of SOFC with $Y_{0.7}Ca_{0.3}Cr_{0.88}Cu_{0.12}O_{3-\delta}$ anode at 500° C., 550° C., and 600° C. measured in $H_2/3\%$ $H_2O$. This anode composition was used for I-V characterizations, because it showed the highest conductivity when compared to other compositions investigated. A high peak power density (PPD) of 1.2 W/cm² (2.2 A/cm²), 1 W/cm² (2.0 A/cm²) and 0.6 W/cm² (1.3 A/cm²) were obtained at 600° C., 550° C., and 500° C. The open current voltage (OCV) of the SOFC obtained was 0.99, 0.96, and 0.90 at 500° C., 550° C., and 600° C., respectively. The resistance calculated from the slope (near zero current regions) on the I-V curve is 0.36, 0.20, and 0.13 $\Omega cm^2$ at 500° C., 550° C., and 600° C., respectively.

Figure 10:
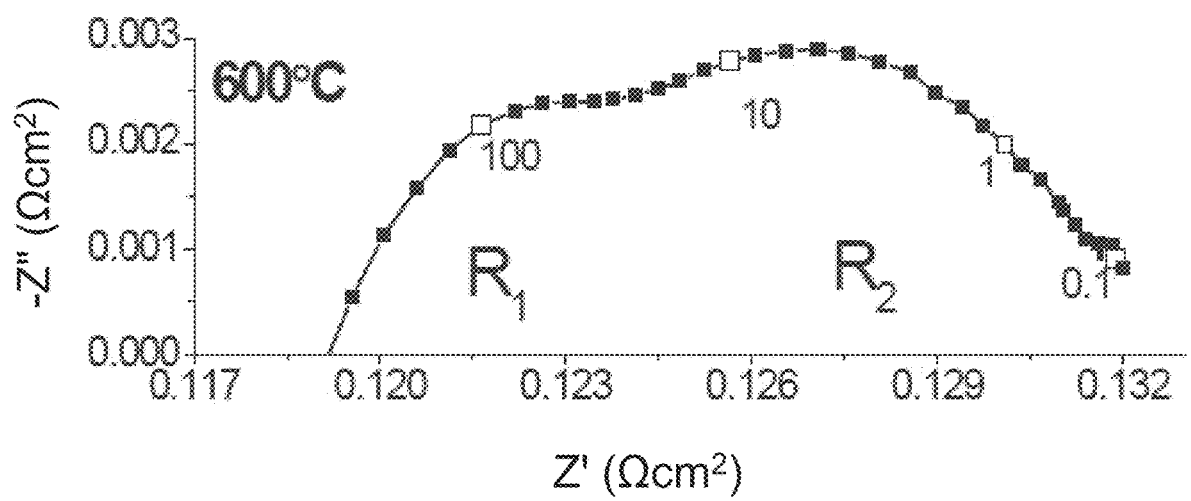
FIG. 10 is a graph of the impedance spectra (Nyquist plot) of a solid oxide fuel cell with $Y_{0.7}Ca_{0.3}Cr_{0.88}Cu_{0.12}O_{3-\delta}$ as the anode. The impedance spectra at 600° C. consisted of an inductive component at very high frequency and two distinct semicircles at high ($R_1$) and low ($R_2$) frequencies.
Figure 11:
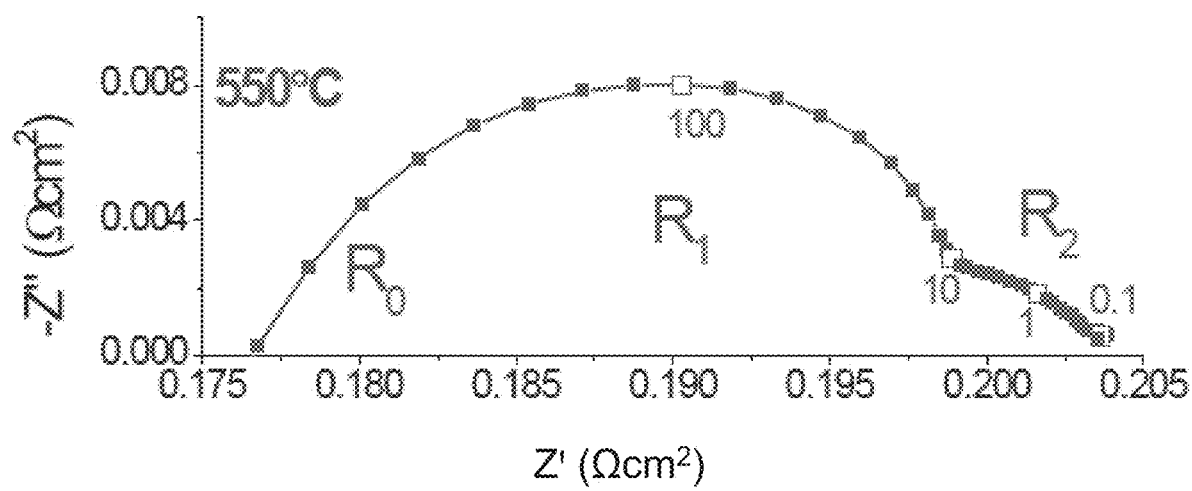
FIG. 11 is a graph of the impedance spectra (Nyquist plot) of a solid oxide fuel cell with $Y_{0.7}Ca_{0.3}Cr_{0.88}Cu_{0.12}O_{3-\delta}$ as the anode. The impedance spectra at 550° C. showed two semicircles overlapped in the high frequency region ($R_0$ and $R_1$) and a distinct arc at the low frequency region ($R_2$).
Figure 12:
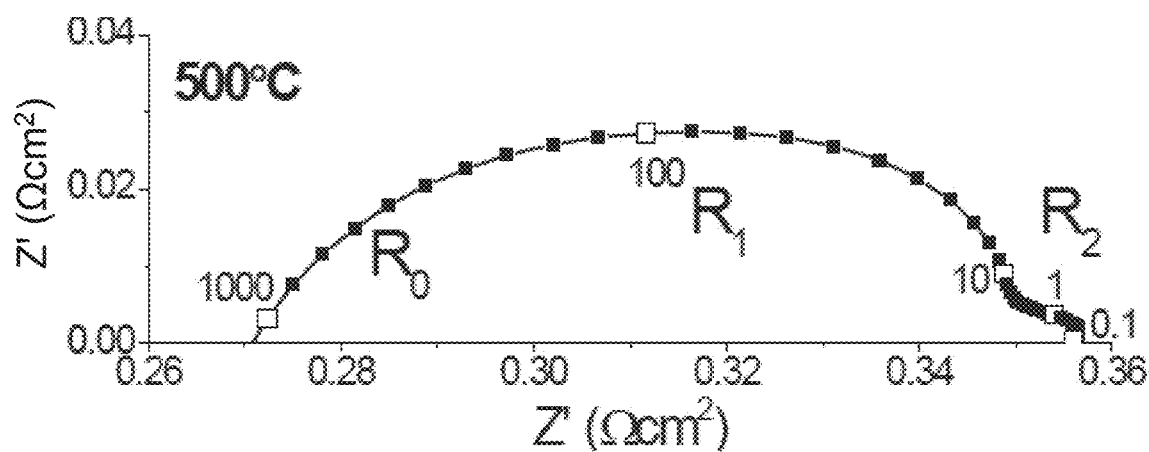
FIG. 12 is a graph of the impedance spectra (Nyquist plot) of a solid oxide fuel cell with $Y_{0.7}Ca_{0.3}Cr_{0.88}Cu_{0.12}O_{3-\delta}$ as the anode. The impedance spectra at 500° C. showed two semicircles overlapped in the high frequency region ($R_0$ and $R_1$) and a distinct arc at the low frequency region ($R_2$).

The impedance spectra of the SOFC investigated are shown in FIG. 10, FIG. 11, and FIG. 12. The high-frequency intercept of the semicircle essentially indicates the ohmic area specific resistance (ASR) of the SOFC (electrolyte+electrodes). The ohmic ASR values extracted from the impedance spectra are 0.119, 0.176, and 0.272 at 600° C., 550° C., and 500° C., respectively. The first semi-circle, $R_1$ at high frequency is related to the non-ohmic polarization resistance arising from the interface of anode/electrolyte and cathode/electrolyte. The second semicircle, $R_2$ at low-frequency ranges is related to the surface absorption/diffusion and gas phase diffusion leading to concentration polarization from the electrodes. Moreover, the impedance spectrum at 550° C. and 500° C. showed two semicircles overlapped in the high frequency region ($R_0$ and $R_1$) and a distinct arc at the low frequency region ($R_2$), therefore an equivalent circuit $\{LR_s \ (R_0Q_0)(R_1Q_1) \ (R_2Q_2)\}$ was used to fit those individual spectrum. $R_s$, $R_1$, and $R_2$ have the same meaning described for 600° C. impedance spectrum. The high frequency semi-circle, $R_0$ can be attributed to the grain boundary resistance contribution of the GDC (<550° C. is the typical temperature region where grain boundary resistance of GDC is usually seen).

Figure 13:
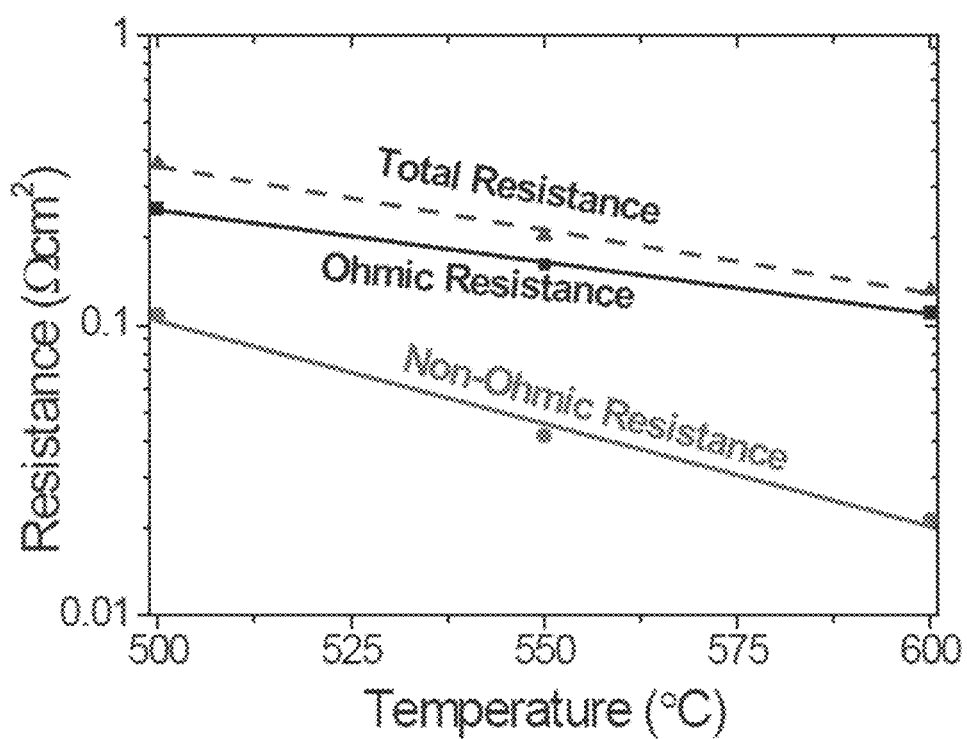
FIG. 13 is a graph of the ohmic, non-ohmic, and total area specific resistance (ASR) of a solid oxide fuel cell with a $Y_{0.7}Ca_{0.3}Cr_{0.88}Cu_{0.12}O_{3-\delta}$ anode.
Figure 14:
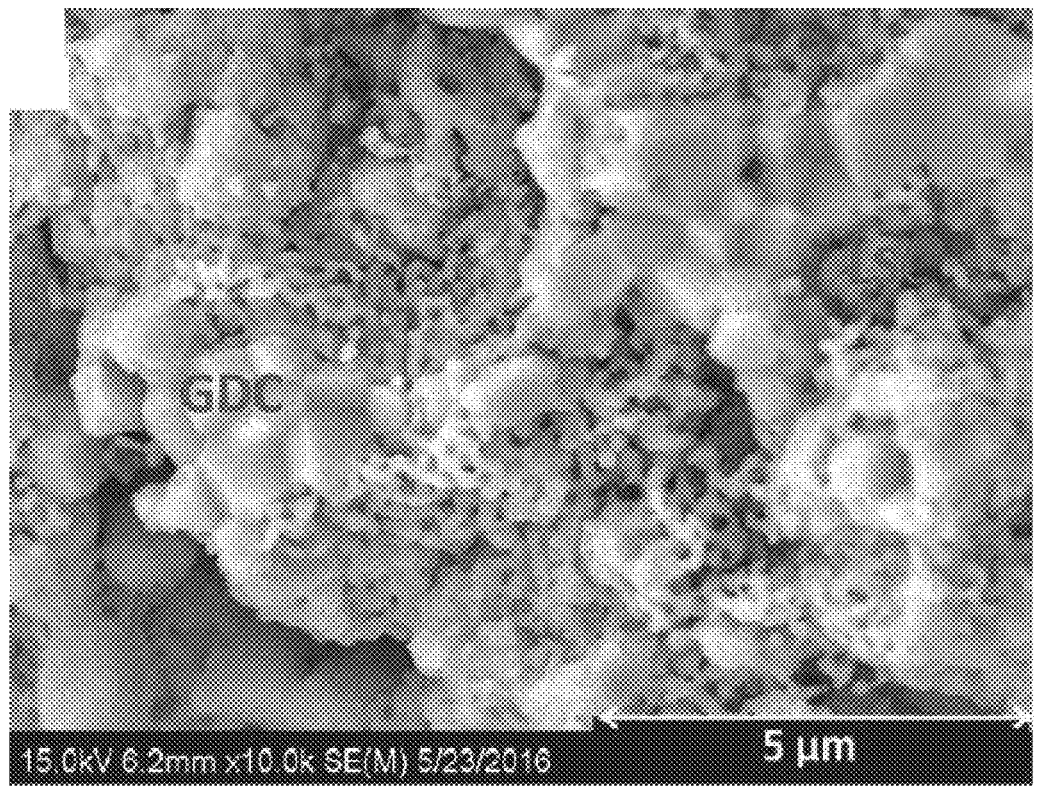
FIG. 14 is a cross sectional SEM image of a post-tested solid oxide fuel cell consisting of $La_{0.8}Sr_{0.2}Co_3$ (LSC) particles incorporated into a GDC scaffold.

In FIG. 13, ohmic, non-ohmic, and total ASR of the SOFC is shown. The total resistance (ohmic+non-ohmic) determined from the EIS analysis and calculated from the slope of I-V curves (as indicated by the dashed line) are essentially identical. The non-ohmic ASR of the samples from impedance spectra was determined to be 0.013, 0.027, and 0.084 at 600° C., 550° C., and 500° C., respectively. The low non-ohmic ASR is attributed to high catalytic activity of the nano Ni-GDC and LSC in the anode and cathode side, respectively. The ohmic ASR of the cell is 0.12 $\Omega cm^2$ at 600° C., which is slightly lower than the calculated ohmic resistance of 23 μm GDC electrolyte (0.14 $\Omega cm^2$ considering the bulk conductivity of 0.016 S/cm for GDC at 600° C. in air). This could be due to the partial reduction of GDC electrolyte on the anode side and overlapping of time constants related to grain boundary resistance of electrolyte with non-ohmic electrode processes. Furthermore, such low ohmic resistance indicates that series resistances caused by the electrodes (anode+cathode) are negligible. In particular to LSC-GDC cathode, the micrograph of post-tested SOFC cross-section is shown in FIG. 14 (LSC particles incorporated into GDC scaffold are labeled). As depicted, LSC is seen to be well-connected on the surface of GDC. This observation further indicates LSC was sufficiently loaded on GDC and necessary percolation for efficient current collection was achieved in the cathode-support.

Orthorhombic perovskite oxides of $Y_{0.7}Ca_{0.3}Cr_{1-x}Cu_xO_{3-\delta}$ (x=0, 0.05, 0.12, and 0.20) were prepared and their applicability as anodes for low temperature SOFCs were investigated using a cathode-supported SOFC. At a relatively low temperature of 650° C., an electrical conductivity of 2.6 S/cm was achieved for the $Y_{0.7}Ca_{0.3}Cr_{0.88}Cu_{0.12}O_{3-\delta}$ anode material. The redox cycling of un-doped (Cu-free) and heavily Cu-doped $Y_{0.7}Ca_{0.3}CrO_{3-\delta}$ (20%) showed good stability at low temperatures, signaling that the intermediate compositions like 12% Cu-doped $Y_{0.7}Ca_{0.3}CrO_{3-\delta}$ would follow the same trend. No chemical reaction between $Y_{0.7}Ca_{0.3}Cr_{0.88}Cu_{0.12}O_{3-\delta}$ and GDC electrolyte was observed up to 1100° C. SOFC electrodes were made catalytically active by infiltrating the precursor of LSC and Ni-GDC on the surface of porous GDC and $Y_{0.7}Ca_{0.3}Cr_{0.88}Cu_{0.12}O_{3-\delta}$, respectively. A high peak power density of 1.2 W/cm$^2$ (2.2 A/cm$^2$) was achieved at 600° C. for $Y_{0.7}Ca_{0.3}Cr_{0.88}Cu_{0.12}O_{3-\delta}$ anode material measured in $H_2$/3% $H_2O$. Microstructure of post-tested SOFC revealed nano-distribution of Ni and GDC on the surface of ceramic anode. The nano-morphology of Ni enhanced the catalytic activity of pristine ceramic anode with negligible catalytic activity for hydrogen oxidation. A well-connected LSC was seen on the surface of GDC leading to improved electrode properties of cathode support.

Example 4

Figure 15:
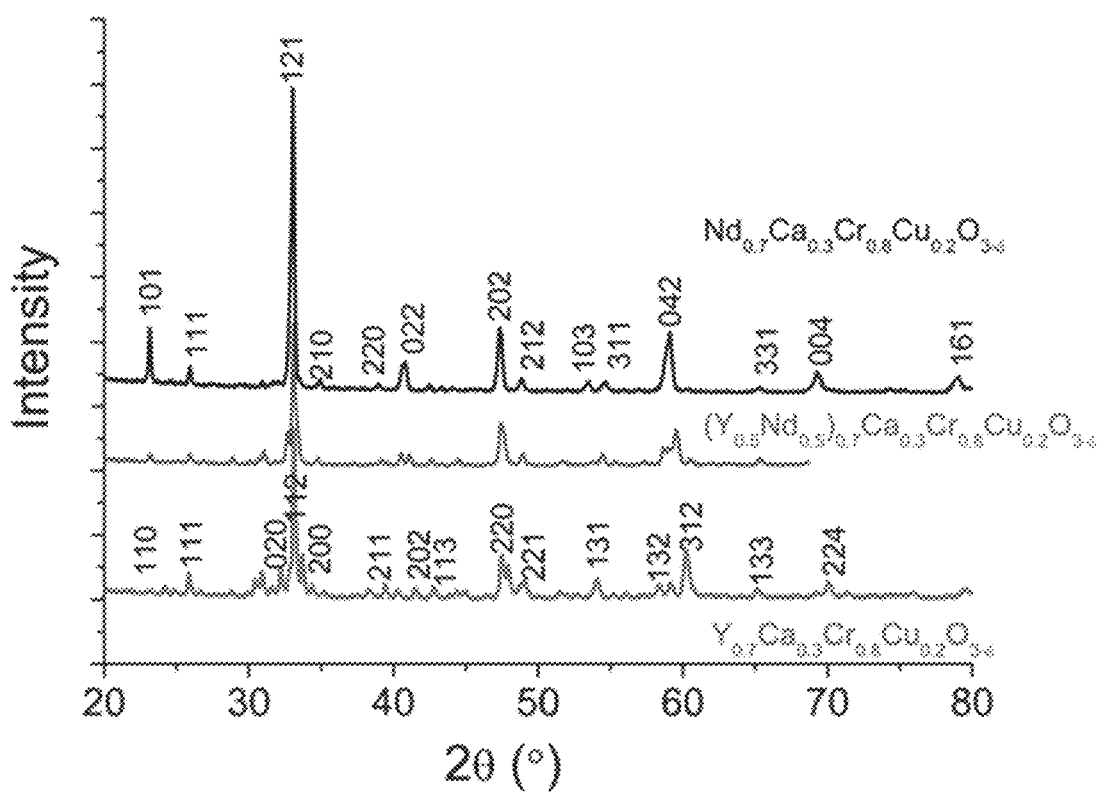
FIG. 15 is an XRD phase analysis of $Nd_{0.7}Ca_{0.3}CrCu_{0.2}O_{3-\delta}$, $(Y_{0.5}Nd_{0.5})_{0.7}Ca_{0.3}Cr_{0.8}Cu_{0.2}O_{3-\delta}$, and $Y_{0.7}Ca_{0.3}Cr_{0.8}Cu_{0.2}O_{3-\delta}$.

Additional compositions of chromate based SOFC anodes such as $Nd_{0.7}Ca_{0.3}Cr_{0.8}Cu_{0.2}O_{3-\delta}$, $(Y_{0.5}Nd_{0.5})_{0.7}Ca_{0.3}Cr_{0.8}Cu_{0.2}O_{3-\delta}$ and $Pr_{0.7}Ca_{0.3}Cr_{0.8}Cu_{0.2}O_{3-\delta}$ were prepared. Stoichiometric amounts of metal oxides and carbonates such as praseodymium oxide, neodymium oxide, yttrium oxide, chromium oxide, copper oxide, and calcium carbonate were used as the starting materials to synthesize the chromate-based perovskite oxides by wet-chemical method. The reaction products were calcined at 1000° C. to obtain ceramic oxides. XRD of $Nd_{0.7}Ca_{0.3}Cr_{0.8}Cu_{0.2}O_{3-\delta}$, $Y_{0.7}Ca_{0.3}Cr_{0.8}Cu_{0.2}O_{3-\delta}$, and $(Y_{0.5}Nd_{0.5})_{0.7}Ca_{0.3}Cr_{0.8}Cu_{0.2}O_{3-\delta}$ at 1150° C. are shown in FIG. 15. All the calcined powders showed orthorhombic perovskite oxide phase.

Figure 16:
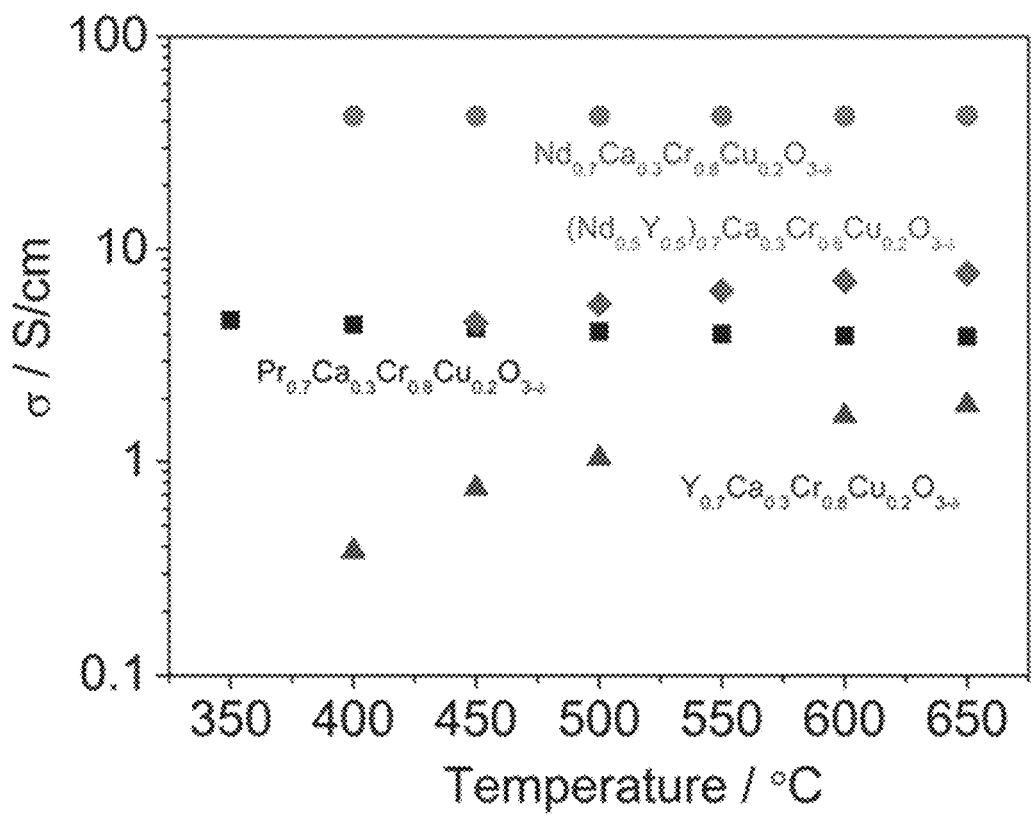
FIG. 16 is a graph of the DC electrical conductivity of $Nd_{0.7}Ca_{0.3}Cr_{0.8}Cu_{0.2}O_{3-\delta}$, $(Y_{0.5}Nd_{0.5})_{0.7}Ca_{0.3}Cr_{0.8}Cu_{0.2}O_{3-\delta}$, $Pr_{0.7}Ca_{0.3}Cr_{0.8}Cu_{0.2}O_{3-\delta}$ and $Y_{0.7}Ca_{0.3}Cr_{0.8}Cu_{0.2}O_{3-\delta}$. The electrical conductivity was measured from 650° C. to 350° C. in reducing gas conditions (10% $H_2/N_2$/3% $H_2O$).

Dense pellets of the prepared ceramic materials were examined to determine the DC electrical conductivity. The electrical conductivity was measured from 650° C. to 350° C. in reducing gas conditions (10% $H_2/N_2$/3% $H_2O$)). FIG. 16 shows that $Nd_{0.7}Ca_{0.3}Cr_{0.8}Cu_{0.2}O_{3-\delta}$ has the highest electrical conductivity of 40-50 S/cm, while the conductivity of $(Nd_{0.5} Y_{0.5})_{0.7} Ca_{0.3}Cr_{0.8}Cu_{0.2}O_{3-\delta}$ and $Pr_{0.7}Ca_{0.3}Cr_{0.8}Cu_{0.2}O_{3-\delta}$ are in the ranges of 7-12 S/cm over a temperature range of 350° C. to 650° C.

Example 5

Figure 17:
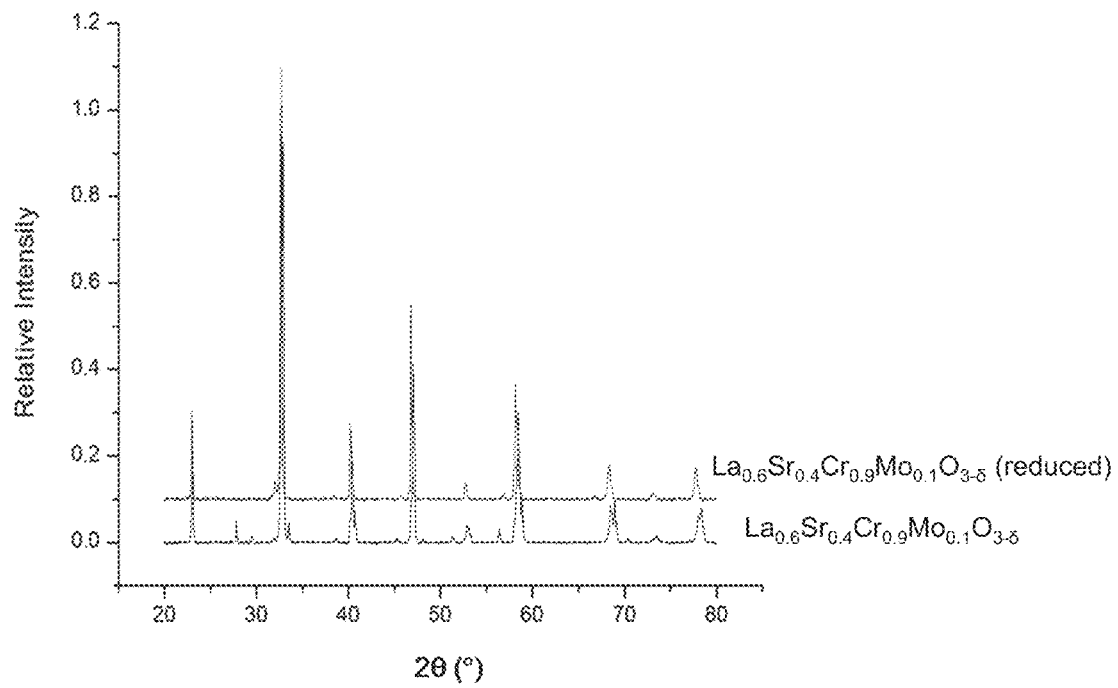
FIG. 17 an XRD pattern of $La_{0.6}Sr_{0.4}Cr_{0.9}Mo_{0.1}O_{3-\delta}$ before and after reduction.
Figure 18:
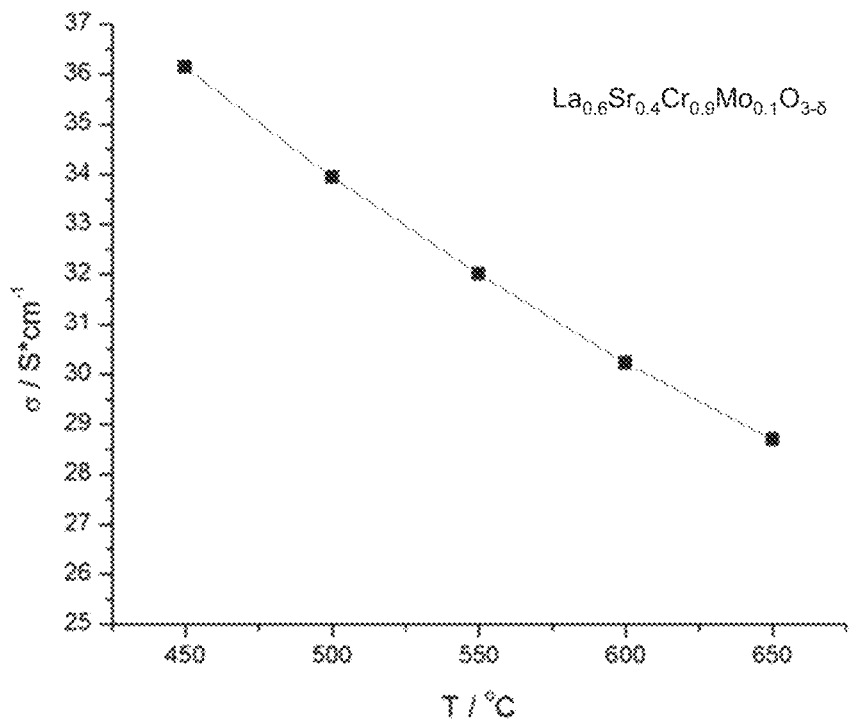
FIG. 18 is a graph of the temperature dependent conductivity of $La_{0.6}Sr_{0.4}Cr_{0.9}Mo_{0.1}O_{3-\delta}$ measured in reducing gas conditions (10% $H_2/N_2$).

Molybdenum co-doped lanthanum chromate, $La_{0.6}Sr_{0.4}Cr_{0.9}Mo_{0.1}O_3$, (LSCM), was developed by solid-state reaction. FIG. 17 shows the XRD patterns of LSCM sintered at 1450° C. for 6 hours in air and a LSCM sample pre-treated in reducing gases over 24 hours at 650° C. The sample sintered in air shows the perovskite type structure with a small amount of strontium chromate impurity; however, the impurity disappeared after reduction. The peaks shift to the lower angle due to the increase in lattice parameter caused by cation expansion and the loss of oxygen. The temperature dependent conductivity of LSCM measured in reducing gas conditions is shown in FIG. 18. The material showed metallic type conductivity. The conductivity was shown to decrease with the increase in temperature. A high conductivity of 36 S/cm was achieved at a temperature of 450° C. measured in 10% $H_2/N_2$.

Having now fully described this invention, it will be understood by those of ordinary skill in the art that the same can be performed within a wide and equivalent range of conditions, formulations and other parameters without affecting the scope of the invention or any embodiment thereof.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

All patents and publications cited herein are fully incorporated by reference herein in their entirety.

We claim:

1. An oxide composition comprising:

$$M^1_{(1-a)}M^2_aCr_{(1-b)}M^3_bO_{3\pm\delta} \qquad (I)$$

wherein:

$M^1$ is a combination of metals, wherein:

$M^1$ is a combination of Nd and Y, Nd and Pr, or Nd and La;

$M^2$ is a metal selected from the group consisting of Ca and Sr;

$M^3$ is a metal selected from the group consisting of Cu and Mo;

a is about 0.1-0.5;

b is about 0.01-0.2; and $0 \leq \delta \leq 1.5$.

2. The oxide composition of claim 1, wherein a is about 0.3-0.4.

3. The oxide composition of claim 1, wherein b is about 0.05-0.2.

4. The oxide composition of claim 1, comprising $(Y_{0.5}Nd_{0.5})_{0.7} Ca_{0.3}Cr_{0.8}Cu_{0.2}O_{3-\delta}$.

5. A solid oxide fuel cell comprising:
(a) a cathode layer;
(b) an electrolyte layer; and
(c) an anode layer, wherein the anode layer comprises an oxide composition of formula (I):

$$M^1_{(1-a)}M^2_a Cr_{(1-b)}M^3_b O_{3\pm\delta} \tag{I}$$

wherein:
$M^1$ is a combination of metals, wherein:
$M^1$ is a combination of Nd and Y, Nd and Pr, or Nd and La;
$M^2$ is a metal selected from the group consisting of Ca and Sr;
$M^3$ is a metal selected from the group consisting of Cu and Mo;
a is about 0.1-0.5;
b is about 0.01-0.2; and
$0 \leq \delta \leq 1.5$.

6. The solid oxide fuel cell of claim 5, wherein a is about 0.3-0.4.

7. The solid oxide fuel cell of claim 5, wherein b is about 0.05-0.2.

8. The solid oxide fuel cell of claim 5, wherein the anode layer comprises $(Y_{0.5} Nd_{0.5})_{0.7} Ca_{0.3}Cr_{0.8}Cu_{0.2}O_{3-\delta}$.

9. The solid oxide fuel cell of claim 5, wherein the cathode layer comprises a material selected from the group consisting of lanthanum strontium cobalt oxide (LSC), yttria stabilized zirconia (YSZ), scandia stabilized zirconia (SSZ), gadolinia doped ceria (GDC), samaria doped ceria (SDC), samaria-neodymium doped ceria (SNDC), erbia stabilized bismuth oxide (ESB), dysprosium tungsten stabilized bismuth oxide (DWSB), yttria stabilized bismuth oxide (YSB), and strontium and magnesium doped lanthanum gallate (LSGM).

10. The solid oxide fuel cell of claim 5, wherein the electrolyte layer comprises a material selected from the group consisting of YSZ, SSZ, GDC, SDC, SNDC, ESB, DWSB, YSB, and LSGM.

11. The solid oxide fuel cell of claim 5, wherein the anode layer is infiltrated with Ni-GDC, $La_{0.4}Sr_{0.6}CoO_{-\delta}$, or a combination thereof.

12. The solid oxide fuel cell of claim 5, wherein $M^1$ is a combination of Y and Nd, $M^2$ is Ca, and $M^3$ is Cu; and wherein the anode layer has a conductivity of between 7 S/cm and 50 S/cm when measured at a temperature between 350° C. and 650° C.

13. The solid oxide fuel cell of claim 5, wherein the solid oxide fuel cell has a power density of between about 300 mW/cm$^2$ and about 1500 mW/cm$^2$ when measured at 500-600° C.

14. The solid oxide fuel cell of claim 12, wherein the anode layer comprises $(Y_{0.5} Nd_{0.5})_{0.7} Ca_{0.3}Cr_{0.8}Cu_{0.2}O_{3-\delta}$.

* * * * *

UNITED STATES PATENT AND TRADEMARK OFFICE
CERTIFICATE OF CORRECTION

PATENT NO. : 11,228,039 B2  
APPLICATION NO. : 16/141051  
DATED : January 18, 2022  
INVENTOR(S) : Abdul Jabbar et al.

Page 1 of 1

It is certified that error appears in the above-identified patent and that said Letters Patent is hereby corrected as shown below:

In the Claims

In Column 22, Claim 11, Line 13, delete "$La_{0.4}Sr_{0.6}CoO_{-\delta}$" and insert --$La_{0.4}Sr_{0.6}CoO_{3-\delta}$--, therefor.

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*